United States Patent
Suwald et al.

(10) Patent No.: US 10,943,080 B2
(45) Date of Patent: Mar. 9, 2021

(54) FINGERPRINT SENSING DEVICE WITH ESD PROTECTION

(71) Applicants: NXP B.V., Eindhoven (NL); Suresh Phadtare, Akkalkot (IN)

(72) Inventors: Thomas Suwald, Hamburg (DE); Milind Phadtare, Bangalore (IN); Dillip Kumar Routray, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/246,352

(22) Filed: Jan. 11, 2019

(65) Prior Publication Data
US 2019/0213375 A1  Jul. 11, 2019

(30) Foreign Application Priority Data
Jan. 11, 2018  (EP) .................................... 18151280

(51) Int. Cl.
*G06K 9/00* (2006.01)
*H01L 27/02* (2006.01)
*G06F 21/32* (2013.01)
*G06Q 20/40* (2012.01)

(52) U.S. Cl.
CPC .......... *G06K 9/0002* (2013.01); *G06F 21/32* (2013.01); *G06K 9/00053* (2013.01); *H01L 27/0248* (2013.01); *G06Q 20/40145* (2013.01)

(58) Field of Classification Search
CPC ............ G06K 9/00053; H01L 27/0248; H01L 27/0255
See application file for complete search history.

(56) References Cited

U.S. PATENT DOCUMENTS

| | | | | |
|---|---|---|---|---|
| 6,088,471 A * | 7/2000 | Setlak | ................ | G06K 9/00053 382/116 |
| 6,330,145 B1 * | 12/2001 | Lepert | ................ | G06K 9/00053 361/220 |
| 6,611,026 B2 * | 8/2003 | Chang | ................ | H01L 27/0255 257/347 |
| 2004/0262689 A1 * | 12/2004 | Chen | ................... | H01L 27/0266 257/355 |
| 2011/0168782 A1 * | 7/2011 | Bergler | ................... | H01L 29/94 235/492 |

(Continued)

OTHER PUBLICATIONS

Nam, J.-M. et al. "Design and Implementation of 160×192 Pixel Array Capacitive-Type Fingerprint Sensor", Circuits Systems and Signal Processing, vol. 24, No. 4, pp. 401-413 (Aug. 1, 2005).

(Continued)

*Primary Examiner* — Yuzhen Shen

(57) ABSTRACT

In accordance with a first aspect of the present disclosure, a fingerprint sensing device is provided, comprising a plurality of sensor cells, wherein each sensor cell comprises: at least one sense plate and a discharge electrode insulated from the sense plate; a first discharge path for discharging a first static electricity charge to a first electric potential terminal; a second discharge path for discharging a second static electricity charge to a second electric potential terminal; a charge reservoir coupled between the first electric potential terminal and the second electric potential terminal. In accordance with a second aspect of the present disclosure, a corresponding method of producing a fingerprint sensing device is conceived.

15 Claims, 21 Drawing Sheets

(56) References Cited

U.S. PATENT DOCUMENTS

| | | | | |
|---|---|---|---|---|
| 2014/0268444 A1* | 9/2014 | Bertin | ............... | H01L 27/0266 |
| | | | | 361/56 |
| 2016/0171275 A1* | 6/2016 | Wang | ............... | G06K 9/00053 |
| | | | | 382/124 |
| 2016/0239700 A1* | 8/2016 | Yang | ............... | G06K 9/0002 |
| 2017/0017828 A1* | 1/2017 | Bernstein | ........... | G06K 9/00053 |
| 2017/0286744 A1 | 10/2017 | Chiang et al. | | |
| 2018/0107856 A1* | 4/2018 | Troccoli | ............ | G06K 9/00087 |
| 2018/0144170 A1 | 5/2018 | Suwald | | |
| 2018/0218192 A1 | 8/2018 | Suwald | | |
| 2019/0197283 A1* | 6/2019 | Riedijk | ............... | G06K 9/28 |

OTHER PUBLICATIONS

Meng, X. et al. "Novel Decoupling Capacitor Designs for sub-90nm CMOS Technology", 7th International Symposium on Quality Electronic Design, pp. 266-271 (Mar. 27, 2006).

Audet, Y. et al. "A CMOS Fingerprint Sensor Based on Skin Resistivity", IEEE North-East Workshop on Circuits and Systems, pp. 269-272 (Jun. 1, 2006).

Yeh, C.-T. et al. "Pmos-based power-rail ESD clamp circuit with adjustable holding voltage controlled by ESD Detection circuit", Microelectronics Reliability, vol. 53, No. 2, pp. 208-214 (Nov. 21, 2012).

Extended European Search Report for Patent Appln. No. 18151280.7 (dated Jul. 20, 2018).

\* cited by examiner

FINGERPRINT SENSING DEVICE WITH ESD PROTECTION

CROSS-REFERENCE TO RELATED APPLICATIONS

This application claims the priority under 35 U.S.C. § 119 of European patent application no. 18151280.7, filed on Jan. 11, 2018, the contents of which are incorporated by reference herein.

OVERVIEW

The present disclosure relates to a fingerprint sensing device. Furthermore, the present disclosure relates to a corresponding method of producing a fingerprint sensing device. Fingerprint sensing devices, such as capacitive fingerprint sensors, may be integrated into resource-constrained devices, for example into smart cards, wearable devices, Internet of Things (IOT) devices, or smart grid devices. Electrostatic discharge (ESD) protection is a challenge in such devices.

SUMMARY

In accordance with a first aspect of the present disclosure, a fingerprint sensing device is provided, comprising a plurality of sensor cells, wherein each sensor cell comprises: at least one sense plate and a discharge electrode insulated from the sense plate; a first discharge path for discharging a first static electricity charge to a first electric potential terminal; a second discharge path for discharging a second static electricity charge to a second electric potential terminal; a charge reservoir coupled between the first electric potential terminal and the second electric potential terminal.

In an embodiment, the first discharge path, the second discharge path and the charge reservoir are implemented in a voltage clamping circuit.

In an embodiment, the charge reservoir is implemented as a capacitor.

In an embodiment, the capacitor is formed by a first capacitor plate in a polysilicon layer and a second capacitor plate in an n-well layer of said device.

In an embodiment, the plurality of sensor cells is organized as a matrix.

In an embodiment, the device further comprises a shield plate positioned between the sense plate and a substrate of the device, wherein the shield plate and the sense plate are separated from each other by an insulator.

In an embodiment, the discharge electrode forms part of a grid of discharge electrodes.

In an embodiment, said grid is connected to an external ground potential via one or more bonding wires and/or bumps.

In an embodiment, multiple bonding wires are connected in parallel.

In an embodiment, the device further comprises a metal layer between the sense plate and the discharge electrode.

In an embodiment, the sense plate and the discharge electrode are implemented in adjacent metal layers of said device.

In an embodiment, the device further comprises a protective layer that covers the plurality of sensor cells, wherein said protective layer has a thickness of at least 20 µm.

In an embodiment, the device further comprises a first readout stage and a second readout stage, wherein the second readout stage is configured to receive a programmable common mode voltage input.

In an embodiment, a smart card, a wearable device, an Internet of Things device, or a smart grid device comprises a fingerprint sensing device of the kind set forth.

In accordance with a second aspect of the present disclosure, a method of producing a fingerprint sensing device is conceived, comprising providing said fingerprint sensing device with a plurality of sensor cells, wherein each sensor cell comprises: at least one sense plate and a discharge electrode insulated from the sense plate; a first discharge path for discharging a first static electricity charge to a first electric potential terminal; a second discharge path for discharging a second static electricity charge to a second electric potential terminal; a charge reservoir coupled between the first electric potential terminal and the second electric potential terminal.

DESCRIPTION OF DRAWINGS

Embodiments will be described in more detail with reference to the appended drawings, in which.

DESCRIPTION OF EMBODIMENTS

Fingerprint-based user authentication is usually convenient and fast, and provides a positive user experience.

Currently, fingerprint-based authentication is mainly enabled in high-performing mobile computing devices. However, it is expected that there exists a growing market potential for such authentication also in the domain of cost-sensitive and low-performing computing platforms. Thus, it would be useful to enable low-cost fingerprint-based user authentication. One factor that contributes to the cost of a fingerprint sensor is the ESD protection circuitry. ESD protection is often provided by external protection devices that require assembly next to the fingerprint sensing device. A more advanced ESD protection method has been disclosed by patent application US 2016/0171275 A1. Such a more advanced ESD protection method may also have disadvantages. For example, the method disclosed in US 2016/0171275 A1 may result in a sense plate with a higher parasitic capacitance. A higher parasitic capacitance will generally result in a lower sensitivity of the fingerprint sensor, and thus in a lower contrast in a fingerprint image, which is undesirable.

Therefore, in accordance with a first aspect of the present disclosure, a fingerprint sensing device is provided, comprising a plurality of sensor cells, wherein each sensor cell comprises: at least one sense plate and a discharge electrode insulated from the sense plate; a first discharge path for discharging a first static electricity charge to a first electric potential terminal; a second discharge path for discharging a second static electricity charge to a second electric potential terminal; a charge reservoir coupled between the first electric potential terminal and the second electric potential terminal. In this way, a low-cost ESD protection may be realized—for example not requiring external protection devices—without negatively the sensitivity of the fingerprint sensing device.

In a practical and efficient implementation, the first discharge path, the second discharge path and the charge reservoir are implemented in a voltage clamping circuit. The charge reservoir may be configured to take up electrostatic charge originating from the sense plate. In a practical and efficient implementation, the charge reservoir is implemented as a capacitor. Furthermore, in a practical and efficient implementation, said capacitor is formed by a first capacitor plate in a polysilicon layer and a second capacitor plate in an n-well layer of the fingerprint sensing device. Furthermore, in an embodiment, the plurality of sensor cells is organized as a matrix. This facilitates controlling the sensor cells.

Figure 1:
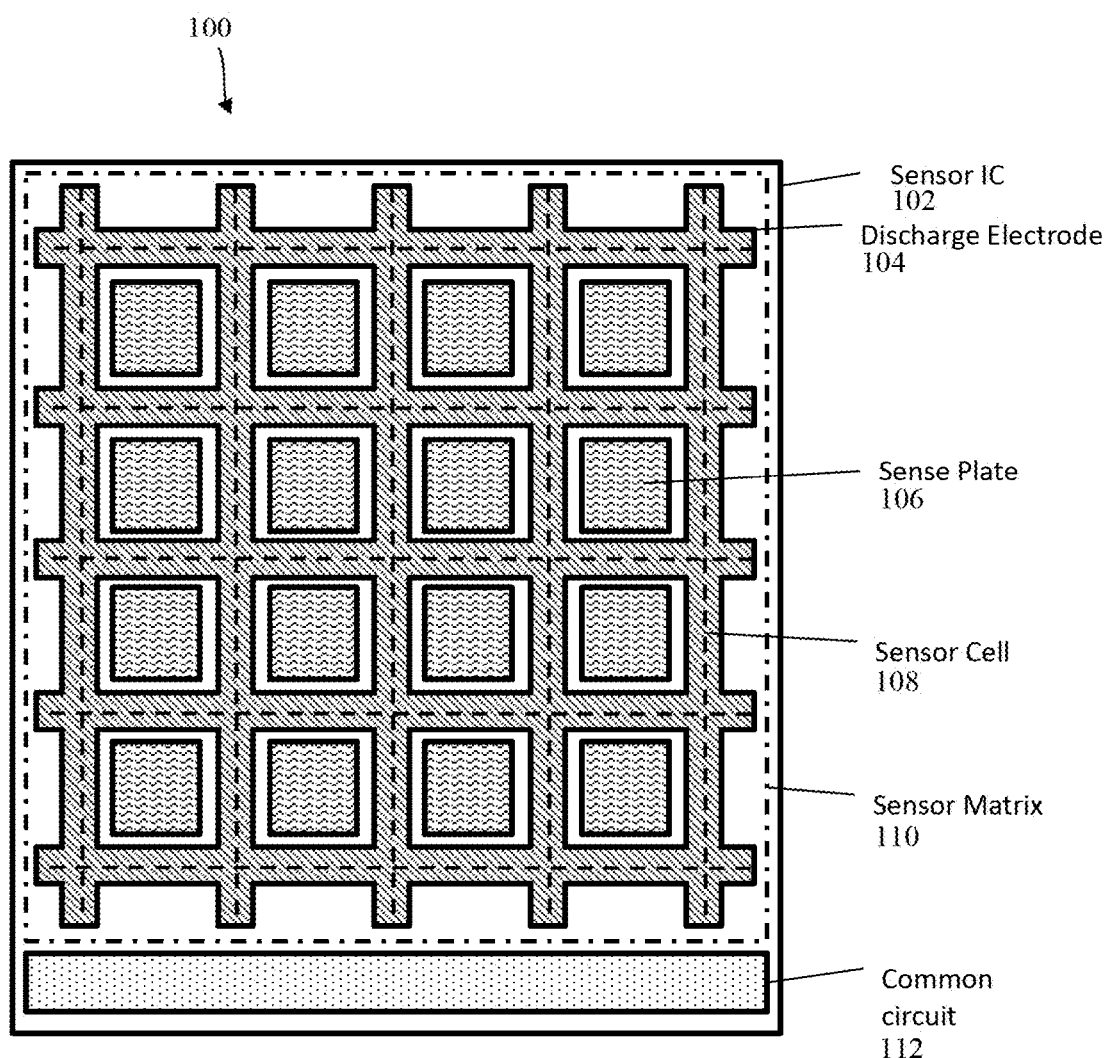
FIG. 1. shows an illustrative embodiment of a fingerprint sensing device.
Figure 2:
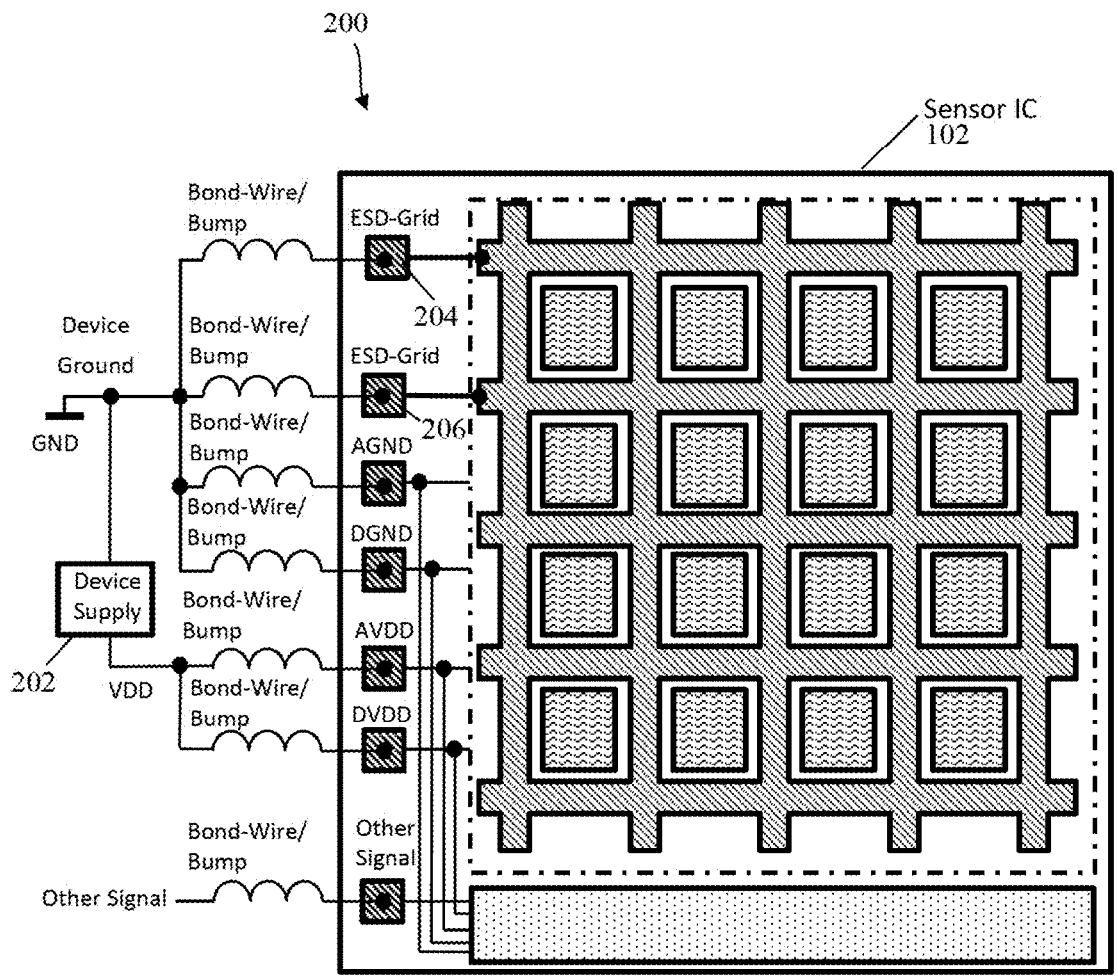
FIG. 2 shows another illustrative embodiment of a fingerprint sensing device.
Figure 3:
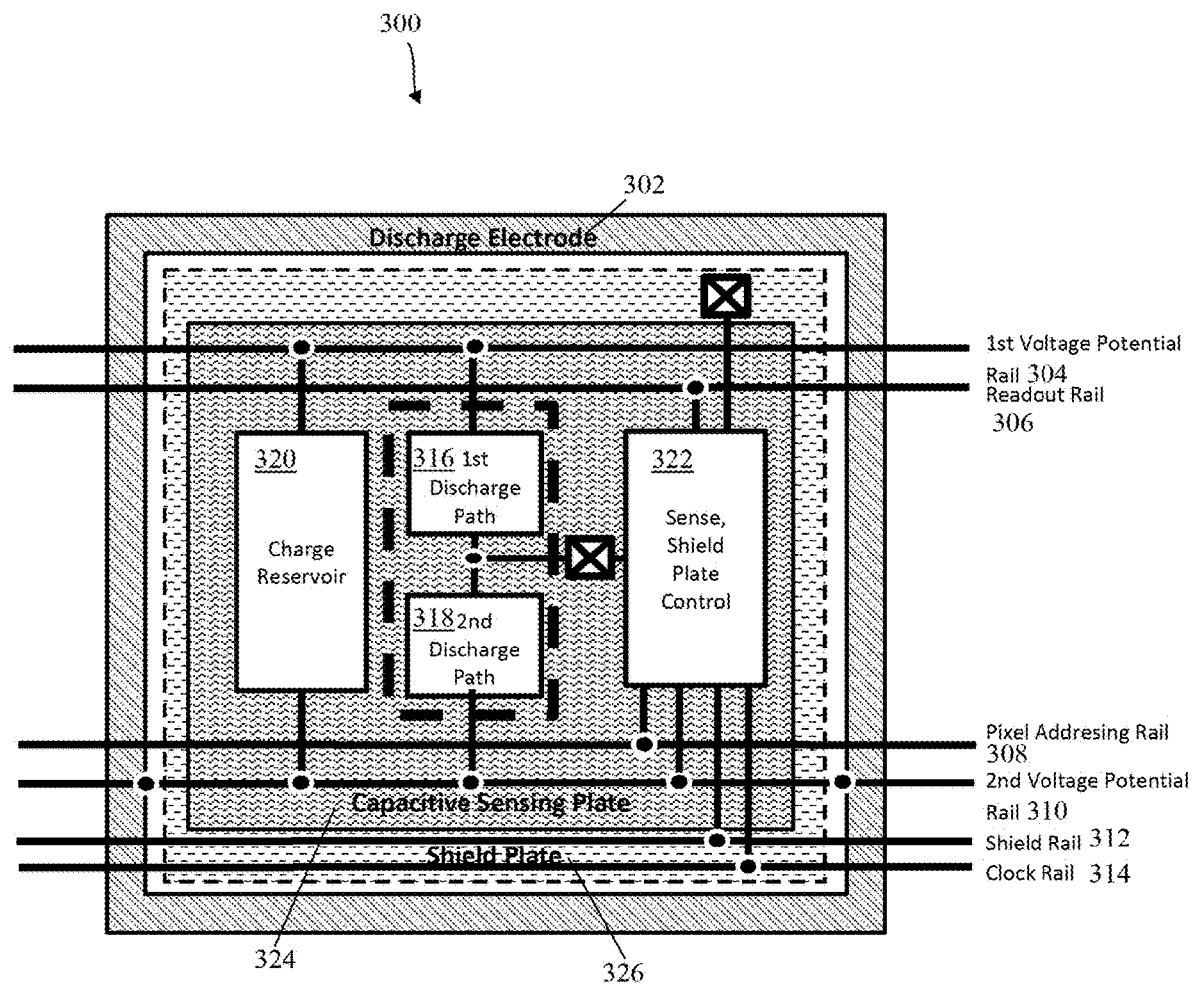
FIG. 3 shows a further illustrative embodiment of a fingerprint sensing device.

FIGS. 1 to 3 show illustrative embodiments of a fingerprint sensing device. The fingerprint sensing device 100 shown in FIG. 1 comprises a sensor integrated circuit (IC) 102. The sensor IC 102 comprises a plurality of sensor cells 108. The sensor cells 108 comprise sense plates 106. Furthermore, the plurality of sensor cells 108 is organized as a sensor matrix 110. Furthermore, in accordance with the present disclosure, the sensor IC 102 comprises a discharge electrode 104. In this embodiment, the discharge electrode is common to all sensor cells 108 and forms a grid. Furthermore, the sensor IC 102 comprises a circuit 112 that is common to all sensor cells 108 and that may be used, for example, to control the sensor cells 108 and to collect measurement results from the sensor cells 108. In this example, the ESD stress may be first lowered by the grid connected to system ground, by flowing a discharge current through the system ground. If any residual charges are still left, then the electrical conduction through the first and second discharge paths may provide additional ESD protection.

FIG. 2 shows another illustrative embodiment of a fingerprint sensing device 200. FIG. 3 shows a further illustrative embodiment of a fingerprint sensing device 300. In the embodiments illustrated in FIGS. 1 to 3, the fingerprint sensing device 100, 200, 300 comprises a common circuit 112 and an array of sensor cells 108 configured to measure the capacitance between a sense plate 106, 324 of the sensor cells 108 and the surface of a finger (not shown). The sensor cells 108 are organized as a matrix having i*j sensor cells 108, arranged in i rows and j columns. Each sensor cell 108 has at least one sense plate 106, 324 operationally coupled to at least one capacitance-to-digital-data-converter (not shown), an ESD electrode 104 being insulated from the at least sense plate 106, 324, a first discharge path 316 for electrostatic charge from each sense plate 106, 324 to a first voltage potential 304, a second discharge path 318 for electrostatic charge from each sense plate 106, 324 to a second voltage potential 310, a charge reservoir 320 coupled between the first voltage potential 304 and the second voltage potential 310 and configured to take up electrostatic charge originating from the at least one sense plate 106, 324, and a control circuit 322 that operationally couples the at least one sense plate 106, 324 to a corresponding capacitance-to-digital-data-converter. In an embodiment, a shield plate 326 may be positioned between the at least one sense plate 106, 324 and a device substrate (not shown), separated by an insulator (not shown). In operation, the shield plate 326 may be coupled, by the control circuit 322, to a DC voltage, to cancel the parasitic capacitance between the at least one sense plate 106, 324 and the device substrate. Thus, the shield plate 326 facilitates cancelling the parasitic capacitance on the sense plate 106, 324.

The first voltage potential rail 304 and the second voltage potential rail 310 shown in FIG. 3 are examples of the above-mentioned first electric potential terminal and second electric potential terminal. These terminals are electrically connected to the discharge electrode 302 through the discharge paths 316 and 318, which may be implemented as a diode configuration. The first voltage potential rail 304 is connected to the negative terminal of first discharge path 316. In this example, as the first voltage potential rail 304 is positive, it keeps the first discharge path 316, e.g. through a diode, electrically non-conducting (i.e. reverse biased) during normal sequence of fingerprint sensing. But, during ESD stress, when the potential of the discharge electrode 302 may become more positive than the voltage, the first discharge path 316 electrically conducts through the diode, thereby clamping the discharge electrode 302 at the voltage on the first voltage potential rail 304. Similarly, the second voltage potential rail 310 is connected to the positive terminal of the second discharge path 318. In this example, as the second voltage potential rail 310 is at zero, it keeps the second discharge path 318, e.g. through a diode, electrically non-conducting (i.e. reverse biased) during a normal sequence of fingerprint sensing. But, during ESD stress, when the potential of the discharge electrode 318 becomes more negative than the voltage on the second voltage potential rail 310, the second discharge path 318 electrically conducts through the diode, thereby clamping the discharge electrode 318 at zero, which is the voltage on the second voltage potential rail 310. In this way, the ESD protection may be realized during fingerprint sensing.

As shown in FIG. 2, the ESD electrodes of all sensor cells form an ESD electrode grid, which is connected through contact pads 204, 206, bonding wires and/or bumps to a ground potential external to the fingerprint sensing device. In an embodiment, multiple bonding wires are connected in parallel to reduce the coupling inductance. The charge reservoirs of all i*j sensor cells form a common charge reservoir that is configured to collect charge from at least one sensing electrode. The ESD grid provides coupling capacitance to the charged finger. Multiple bonding wires/bumps connected to the ESD grid also facilitate providing a higher current carrying capability for the ESD grid. The common circuit and also circuits within the sensor cell matrix are provided with separate analog and digital supply voltage and ground connection using separate IO pad cells AGND, DGND, AVDD, DVDD, and bonding wires/bumps to avoid noise coupling.

FIGS. 4 to 7 illustrate various embodiments for constructing the sense plate, shield plate, ESD electrode and charge storage capacitor.

Figure 4:
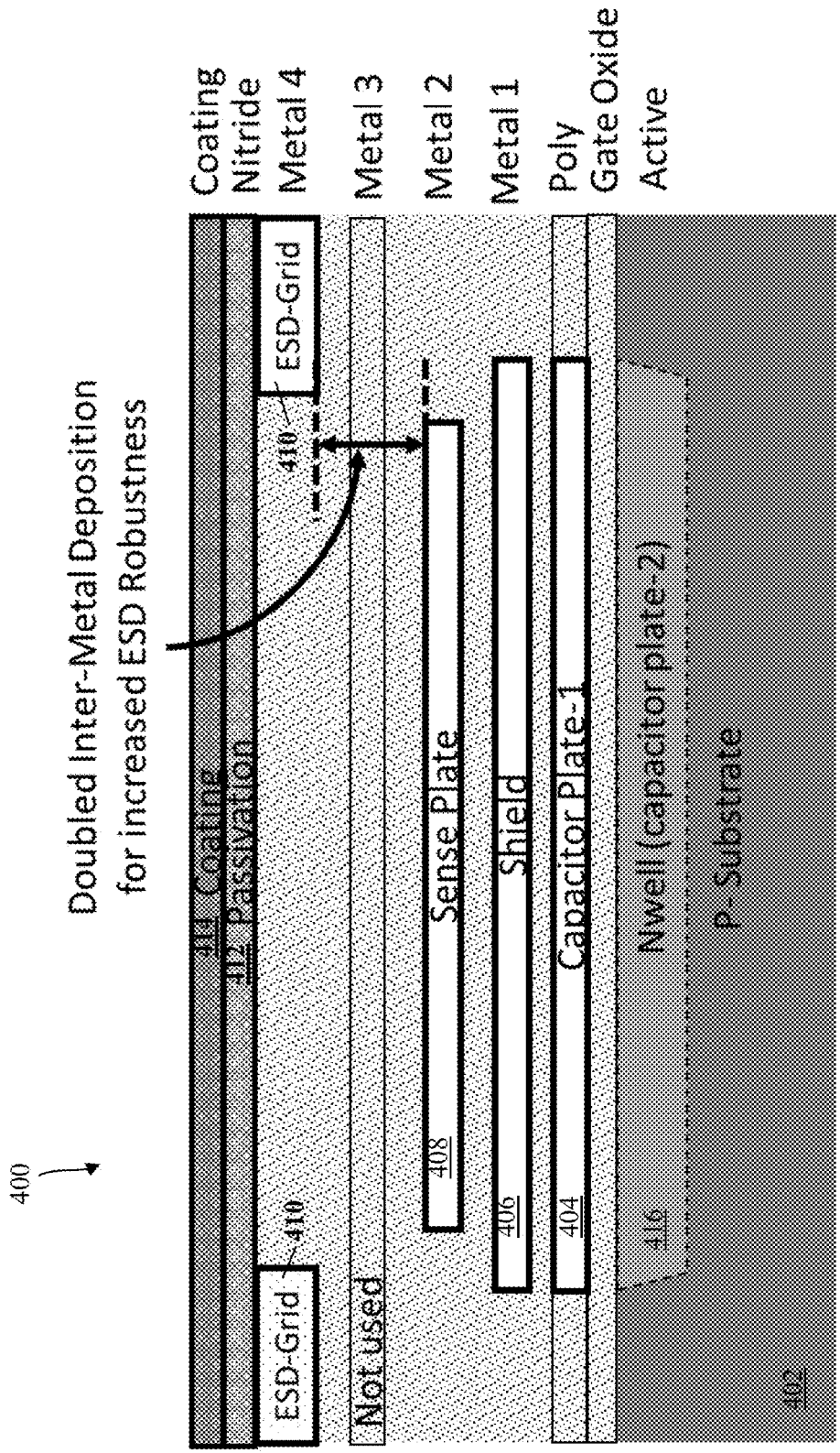
FIG. 4 shows an illustrative embodiment a sensor cell shown in cross-section.

FIG. 4 shows an illustrative embodiment a sensor cell shown in cross-section 400. In particular, FIG. 4 shows an embodiment of a cell constructed by means of a process that uses four metal layers. A first metal layer is used to construct the shield plate 406. A first inter-metal dielectric layer is formed on top of the first metal layer. The sense plate 408 is constructed using the second metal layer. A second dielectric layer is formed on top of the second metal layer. A third metal layer is advantageously not utilized on top of the sense plate 408. However, it can be used in other parts of the sensor. A third dielectric layer is formed on top of the third metal layer. A fourth metal layer is used to construct the ESD electrode 410. A passivation layer 412 is formed on top of the fourth metal layer and finally a scratch protection coating 414 is placed above the passivation layer 412. Accordingly, in an embodiment, the fingerprint sensing device further comprises a metal layer between the sense plate 408 and the discharge electrode 410. This embodiment has the advantage of creating more distance between the sense plate 408 and the ESD grid 410, which facilitates withstanding higher ESD stress and reduces the parasitic capacitance. The charge storage capacitor is formed using poly layer and the n-well as the two parallel plates 404, 416. The coating 414 may have a thickness of at least 20 µm. In this way, the voltage that builds up on the sense plate 408 when a finger comes into its proximity can be kept within limits. More specifically, as the thickness of the coating 414 increases the induced voltage on the sense plate 408 due to ESD stress reduces and can be kept within certain limits to avoid extreme severity of ESD stress on the sense plate 408. Furthermore, as mentioned, the coating 414 may provide scratch protection.

Figure 5:
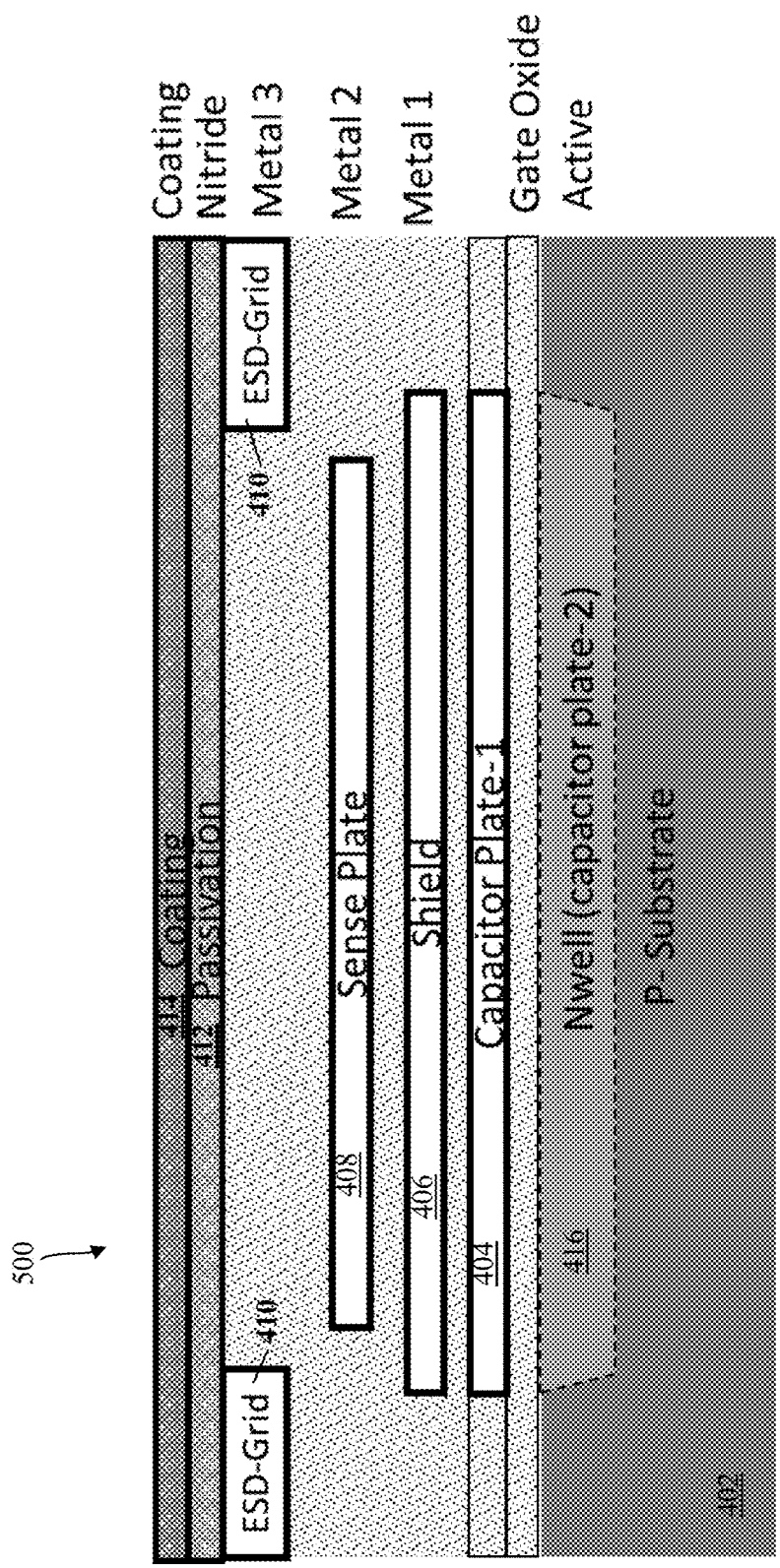
FIG. 5 shows another illustrative embodiment a sensor cell shown in cross-section.

FIG. 5 shows another illustrative embodiment a sensor cell shown in cross-section 500. In particular, FIG. 5 shows an embodiment of a cell constructed by means of a process that uses three metal layers. A first metal layer is used to construct the shield plate 406. A first inter-metal dielectric layer is formed on top of the first metal layer. The sense plate 408 is constructed using the second metal layer. A second dielectric layer is formed on top of the second metal layer. A third metal layer is used to construct the ESD electrode 410. A passivation layer 412 is formed on top of the third metal layer and finally a scratch protection coating 414 is added on top of the passivation layer 412. Accordingly, in an embodiment, the sense plate and the discharge electrode are implemented in adjacent metal layers of the fingerprint sensing device. This embodiment has the advantage of using less metal layers. The charge storage capacitor is formed using poly layer and the n-well as the two parallel plates 404, 416.

Figure 6:
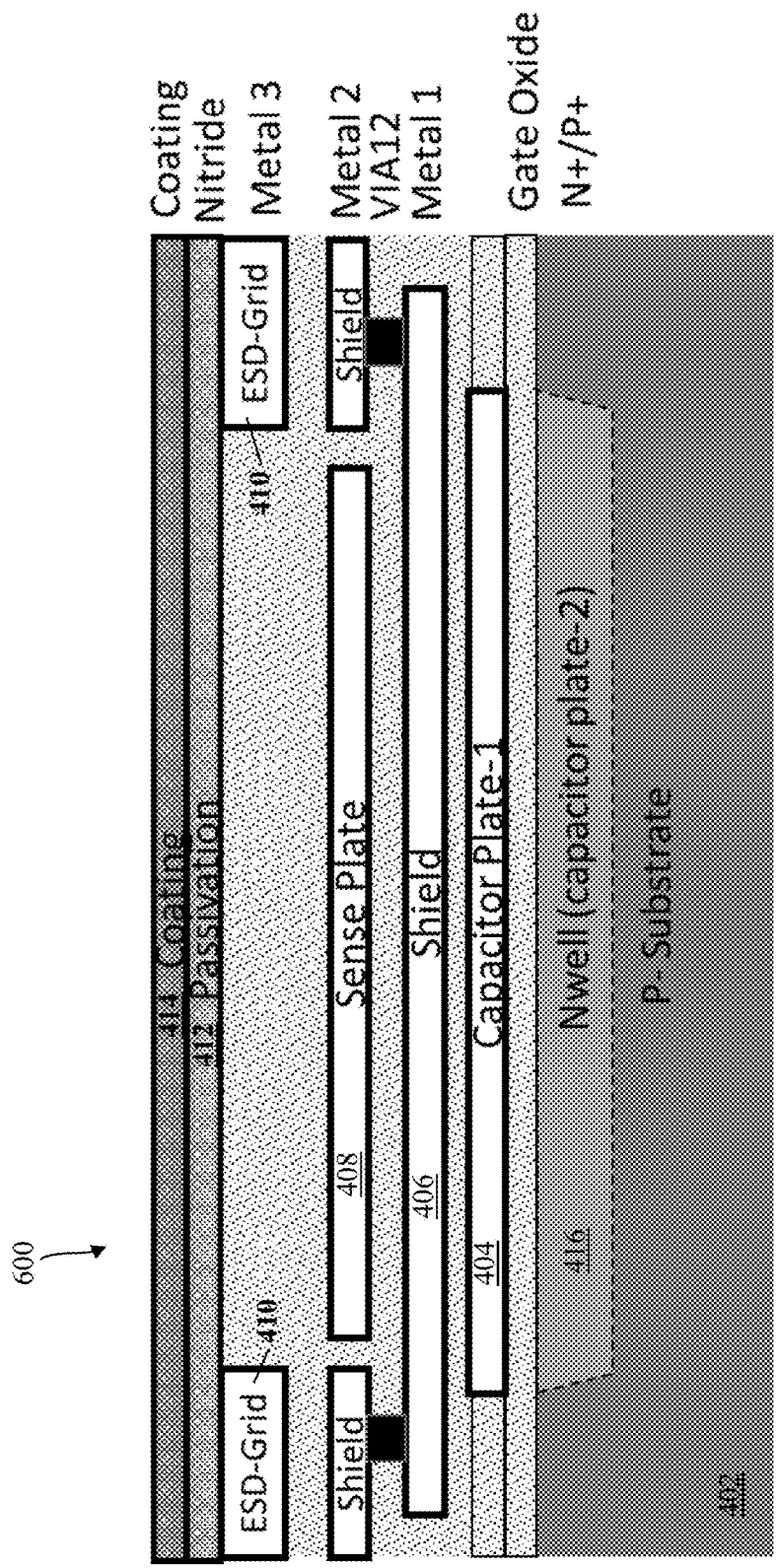
FIG. 6 shows a further illustrative embodiment a sensor cell shown in cross-section.

FIG. 6 shows a further illustrative embodiment a sensor cell shown in cross-section 600. In particular, FIG. 6 shows another embodiment of a cell constructed by means of a process that uses three metal layers. A first metal layer is used to construct the shield plate 406. A first inter-metal dielectric layer is formed on top of the first metal layer. A sense plate 408 is constructed using the second metal layer. The second metal layer is also used for constructing a pan of the shield plate 406. The parts of the shield plate 406 in the first metal layer and the second metal layer are connected to each other using vias. A second dielectric layer is formed on top of the second metal layer. The third metal layer is used to construct the ESD electrode 410. A passivation layer 412 is formed on top of the third metal layer and finally a scratch protection coating 414 is added on top of the passivation layer 412. This embodiment has the advantage of better shielding. The charge storage capacitor is formed using poly layer and the n-well as the two parallel plates 404, 416.

Figure 7:
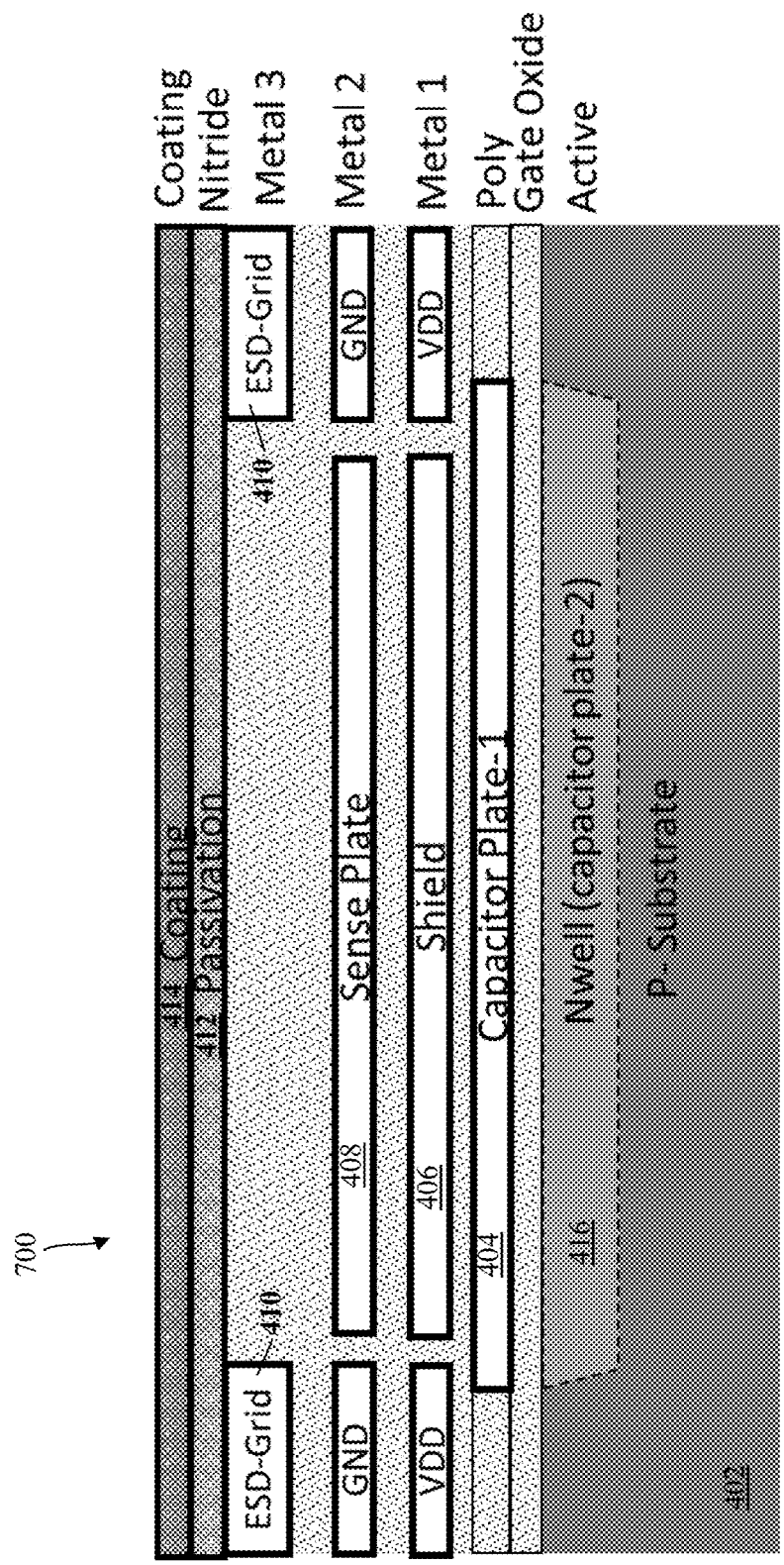
FIG. 7 shows a further illustrative embodiment a sensor cell shown in cross-section.

FIG. 7 shows a further illustrative embodiment a sensor cell shown in cross-section 700. In particular, FIG. 7 shows a further embodiment of a cell constructed by means of a process that uses three metal layers. A first metal layer is used to construct the shield plate 406. The first metal layer is also used for constructing an electrode attached to a first system voltage. The first system voltage may be a VDD supply voltage. A first inter-metal dielectric layer is formed on top of the first metal layer. The sense plate 408 is constructed using the second metal layer. The second metal layer is also used for constructing an electrode attached to a second system voltage. The second system voltage may be a system ground voltage GND. A second inter-metal dielectric layer is formed on top of the second metal layer. The third metal layer is used to construct the ESD electrode 410. A passivation layer 412 is formed on top of the third metal layer and finally a scratch protection coating 414 is added on top of the passivation layer 412. The charge storage capacitor is formed using poly layer and the n-well as the two parallel plates 404, 416.

Figure 8:
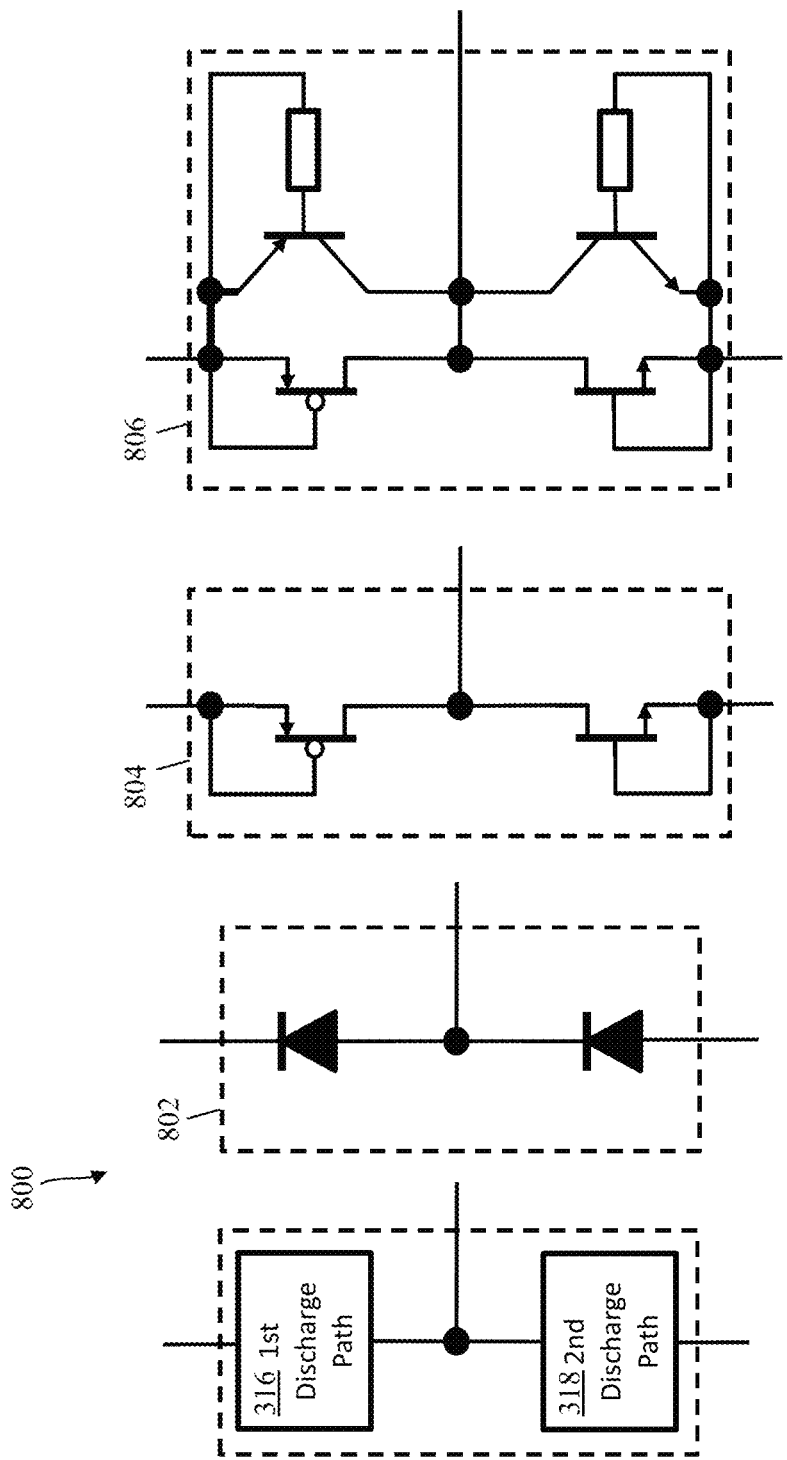
FIG. 8 shows illustrative embodiments of discharge path implementations.

FIG. 8 shows illustrative embodiments of discharge path implementations 800. In particular, the first discharge path 316 and second discharge path 318 shown in FIG. 3 may be implemented in different ways. In particular, the discharge paths 316, 318 may be implemented by diodes, Metal Oxide Semiconductor Field Effect Transistors (MOSFETs), parasitic bipolar junction transistors (pBJTs) or combinations thereof. For example, in a first implementation 802 diodes are used, in a second implementation 804 MOSFETs are used, and in a third implementation 804 MOSFETs and pBJTs are used. In case of diodes, the anode-terminal may be connected to a positive supply voltage, and the cathode-terminal may be connected to circuit ground potential. In case of MOSFETs, the source terminal of the PMOS may be connected to a positive supply voltage, and the source terminal of the PMOS may be connected to circuit ground potential. In case of pBJTs, the emitter of the PNP transistor may be connected to a positive supply voltage, and the emitter of the NPN transistor may be connected to circuit ground potential.

Figure 9:
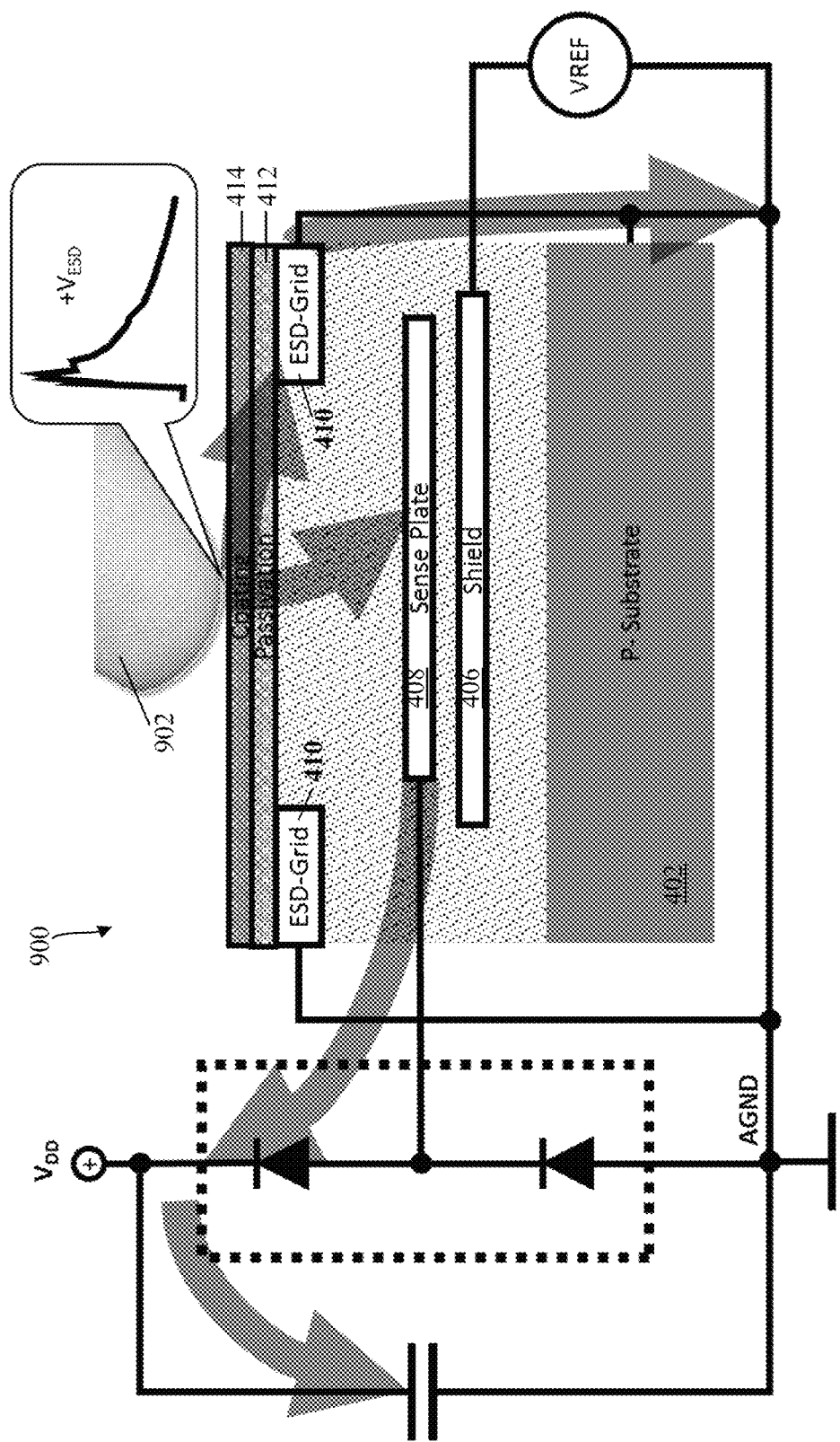
FIG. 9 shows an illustrative embodiment of a discharge path in operation.
Figure 10:
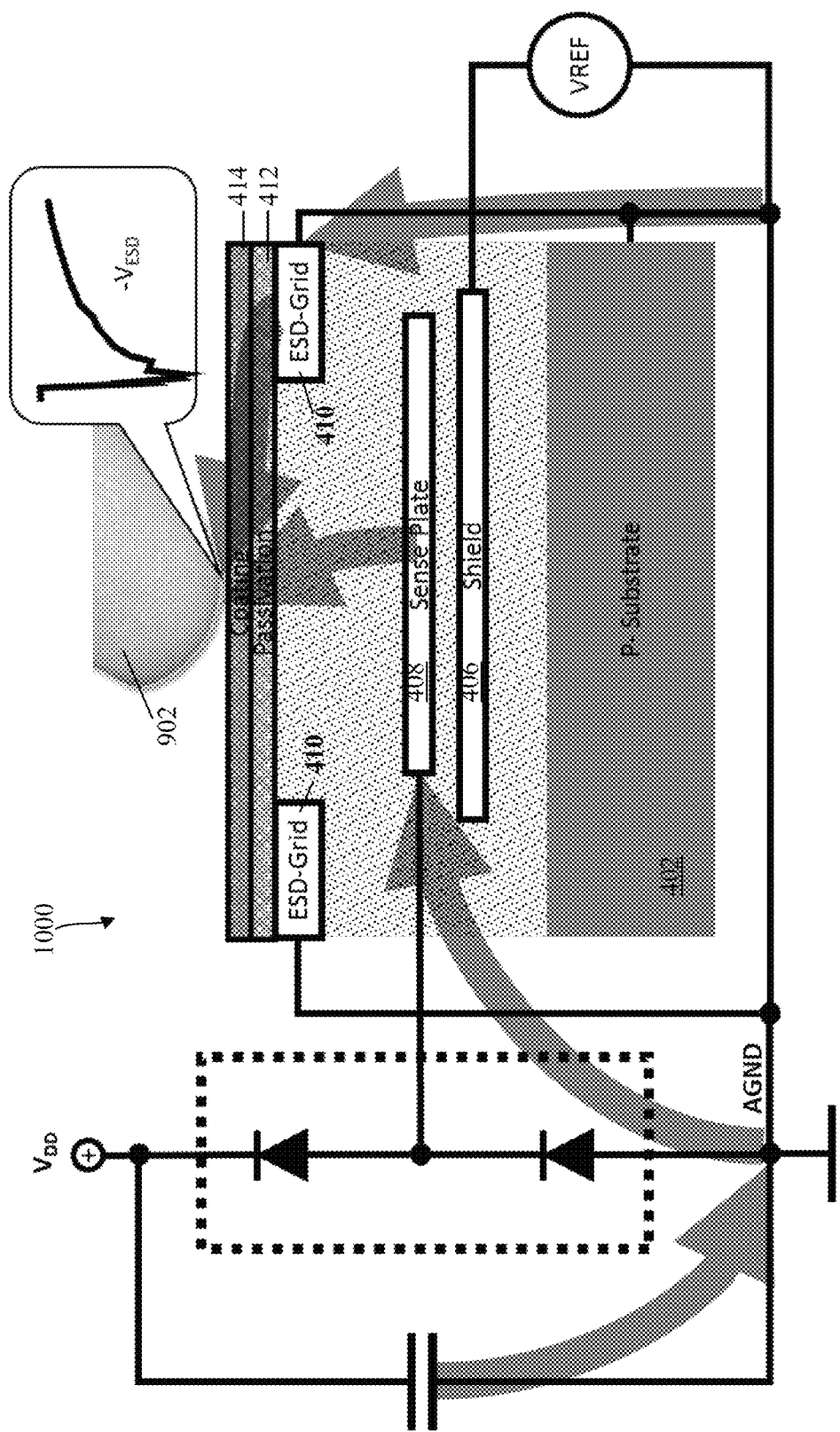
FIG. 10 shows another illustrative embodiment of a discharge path in operation.

FIGS. 9 and 10 show illustrative embodiments of a discharge path in operation 900, 1000. The ESD voltage stress is first lowered by the ESD electrode grid 410 via providing a larger capacitive coupling to the finger. Due to the capacitive coupling, a positive electrostatic voltage causes a negative charge to be brought on the ESD electrode grid 410 from the system ground, which results in a discharge current towards the grid 410. In case of a negative ESD potential, a positive charge is brought on the discharge grid 410 by pushing negative charge to the system ground, which results in a discharge current towards the system ground. Although the ESD stress is lowered by the ESD electrode grid 410, it can still damage the devices connected to the sense plate 408 if no additional protection is provided. The positive ESD charge on the fingertip induces a positive voltage on the sense plate 408. A discharge path is provided from the sense plate 408 for the positive potential as shown in FIG. 9 to keep the sense plate voltage at a safe level. The discharge path for the positive potential goes through the upper diode connected to the sense plate 408 and into the charge storage capacitor, which is present in each sensor cell. The negative electrostatic voltage induces a negative voltage on the sense plate 408. FIG. 10 illustrates the discharge path from the sense plate 408 for the negative voltage to keep it at a safe level. The discharge path for the negative voltage is via the lower diode connected to the system ground potential. The negative potential discharge may also be taken up by the charge storage capacitor coupled between the positive supply voltage and circuit around.

Figure 11:
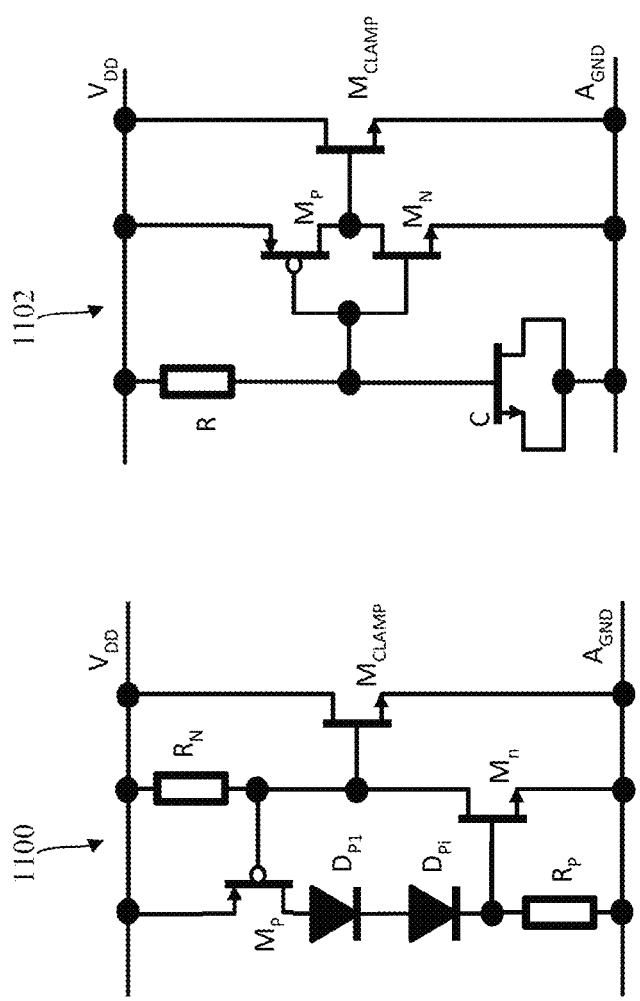
FIG. 11 shows illustrative embodiments of supply rail clamp circuits.
Figure 12:
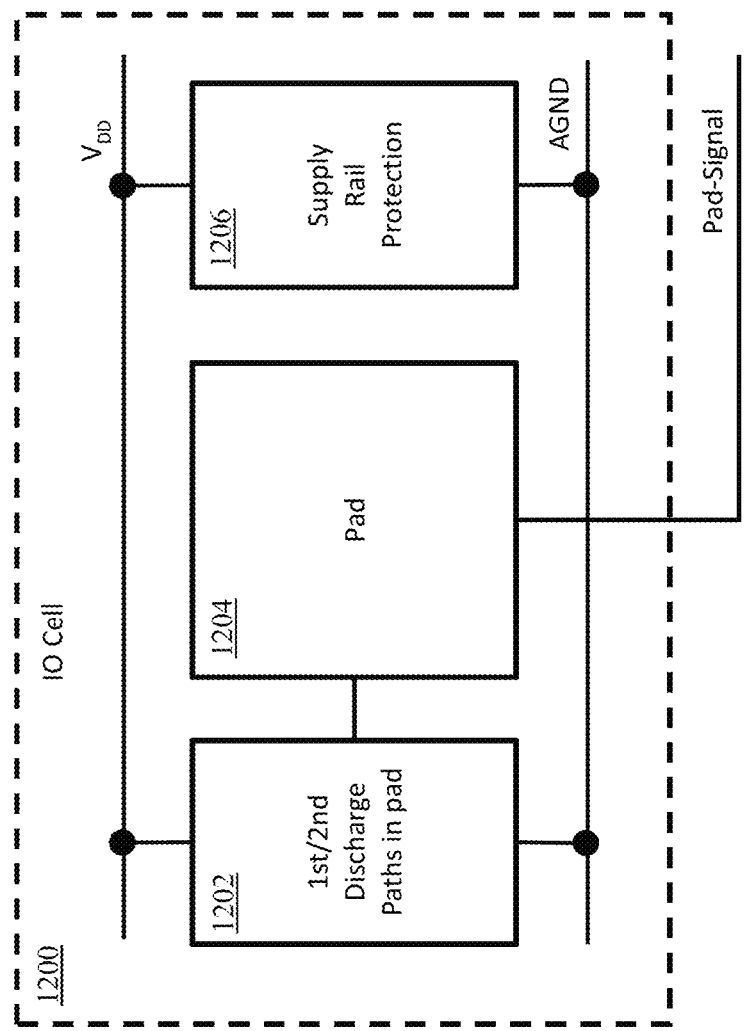
FIG. 12 shows an illustrative embodiment of an 10 cell.

FIG. 11 shows illustrative embodiments of supply rail clamp circuits 1100, 1102. FIG. 12 shows an illustrative embodiment of an IO cell 1200. This JO cell 1200 may be a IO pad cell AGND, DGND, AVDD, DVDD, as shown in FIG. 2. In particular, FIG. 11 shows supply rail clamps 1100, 1102 that may be required to clamp the supply rail to a safe potential if too much charge is collected by the charge reservoir. In other embodiments, a supply rail clamp may be embedded in an IO pad cell protection circuit 1206 as shown in FIG. 12.

Figure 13:
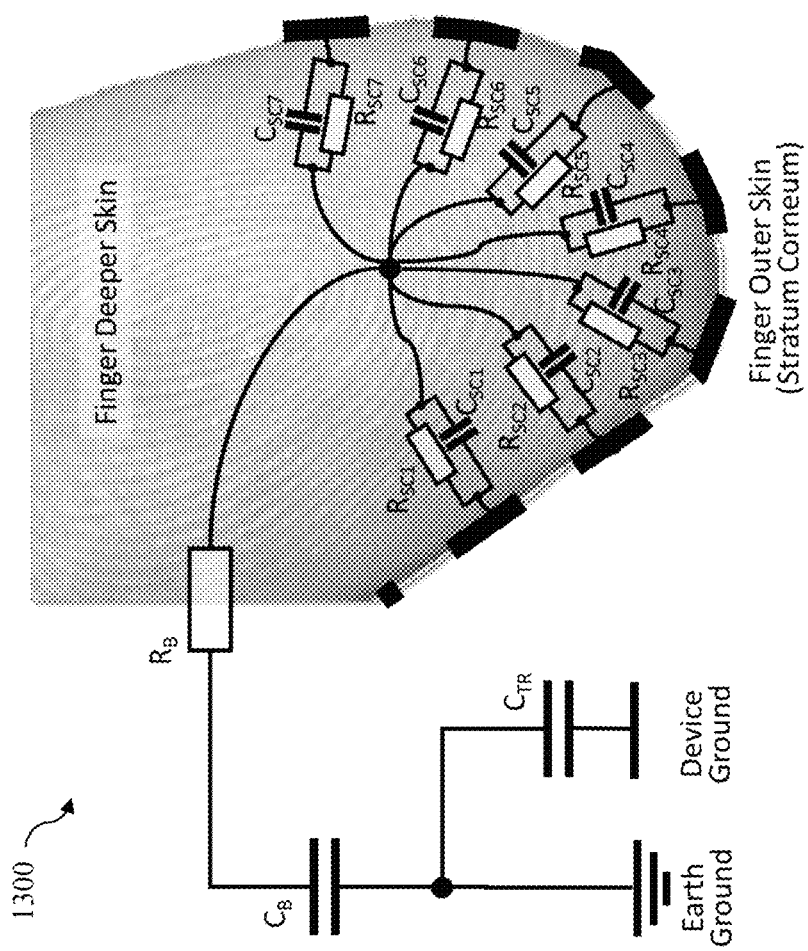
FIG. 13 shows an illustrative embodiment of a coupling from a fingertip to circuit ground.

FIG. 13 shows an illustrative embodiment of a coupling 1300 from a fingertip to circuit ground. In particular, a schematic view of said coupling is provided. The outer skin of the finger (stratum corneum) may be modeled by parallel coupled capacitances $C_{SCi}$ and resistances $R_{SCi}$. The resistances $R_{SCi}$ model the moisture dependency of the skin impedance. If the outer skin is dry it may exhibit preferably capacitance behavior, in case of a wet finger preferably resistive behavior may be exhibited. The outer skin components couple to the internal body resistance RB, which in turns couples to the body capacitance $C_B$ and to earth potential. In case of mains operated devices, coupling $C_{TR}$ between earth potential and circuit ground is established by the transformer's winding capacitance, thus closing the path from fingertip to circuit ground. In case of mains operated devices $C_{TR}$ may be in the order of hundreds of pF, in case of battery operated devices $C_{TR}$ may be in the order of tens of pF.

Figure 14:
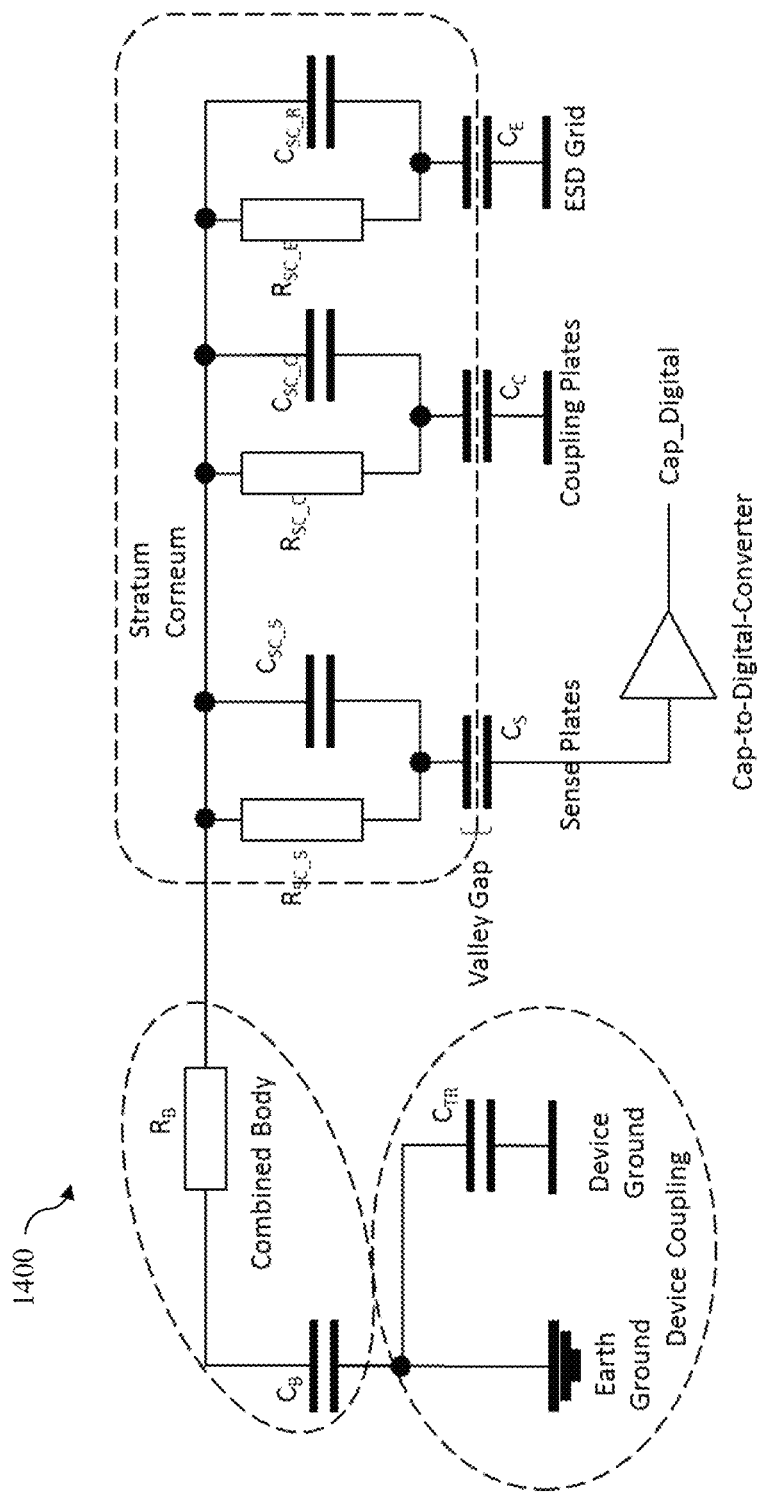
FIG. 14 shows an illustrative embodiment of coupling paths.

FIG. 14 shows an illustrative embodiment of coupling paths 1400. In particular, FIG. 14 shows the three coupling paths from the fingertip, which acts as a counter electrode for capacitance measurement, to the circuit ground. A first path is established by sense plates being connected by switches to circuit ground. In case of an 80*80-pixel sensor up to 6400 sense plates may be connected to ground, thus forming a relatively large coupling capacitor in the nF range. A second path is established, in accordance with the present disclosure, from circuit ground via the ESD grid to the fingertip, also forming a relatively large coupling capacitor in the nF range. A third path is established through the outer skin impedance, body resistance RB, body capacitance $C_B$ to earth and coupling capacitance $C_{TR}$ from earth to circuit ground.

Figure 15:
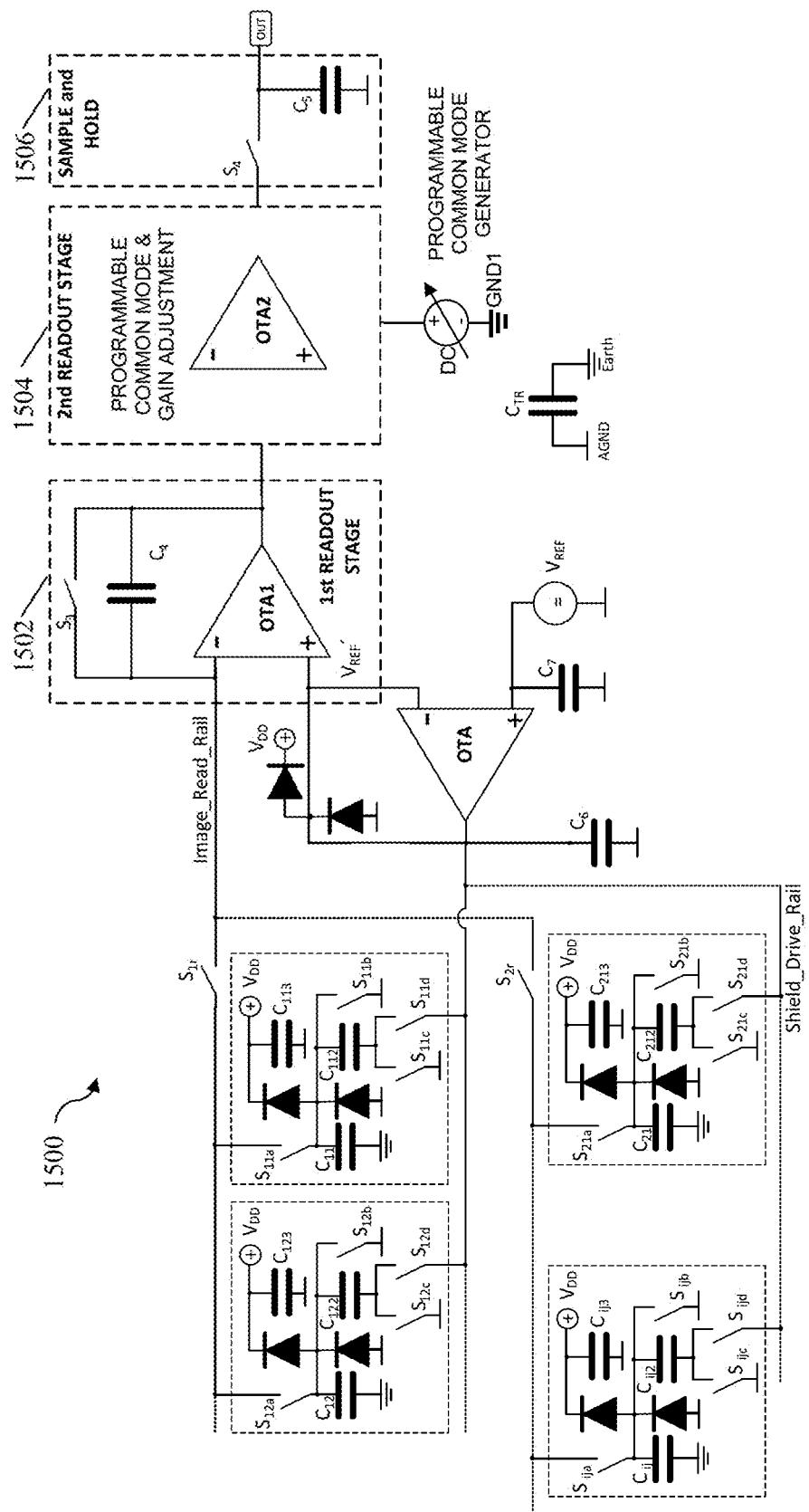
FIG. 15 shows an illustrative embodiment of a capacitance measurement principle.

FIG. 15 shows an illustrative embodiment of a capacitance measurement principle 1500. A capacitance-to-digital conversion is performed using a common readout circuit, which is connected to each sensor cell in a sequence. The readout circuit includes two stages 1502, 1504. The first stage 1502 is a sense amplifier that primarily performs the capacitance-to-voltage conversion using a switched capacitor topology. The first stage voltage output is proportional to the parasitic capacitance between the sense plate and the ESD grid, along with the variations of the ridge/valley sensed capacitance. To ensure a proper dynamic range of the sensed voltage output before analog to digital conversion, the common mode voltage input for the second readout stage 1504 can be positioned within the peak to peak value of first stage output, which is proportional to the ridge/valley sensed capacitance. The common mode voltage can be made programmable to compensate for the change in parasitic capacitance due to manufacturing process variations. The second readout stage 1504 with switched capacitor topology incorporates programmable gain adjustment for controlling the brightness of the image proportional to the sensed capacitance. Both the readout stages 1502, 1504 comprise an operational transconductance amplifier (OTA). So as to perform sense capacitance measurement using a common readout circuit, each sensor cell (i,j) in the matrix comprises dedicated switches attached to the sense plate and shield plate. Two dedicated switches are attached to the sense plate. A first switch $S_{ija}$ connects the sense plate to a common row read rail. A second switch $S_{ijb}$ connects the sense plate to system ground potential. Two dedicated switches are attached to the shield plate. A first switch $S_{ijc}$ connects the shield plate to the system ground potential. A second switch $S_{ijd}$ connects the shield plate to a common shield drive rail driven by a fixed reference potential meant for the first stage 1502 of the readout system.

Figure 16:
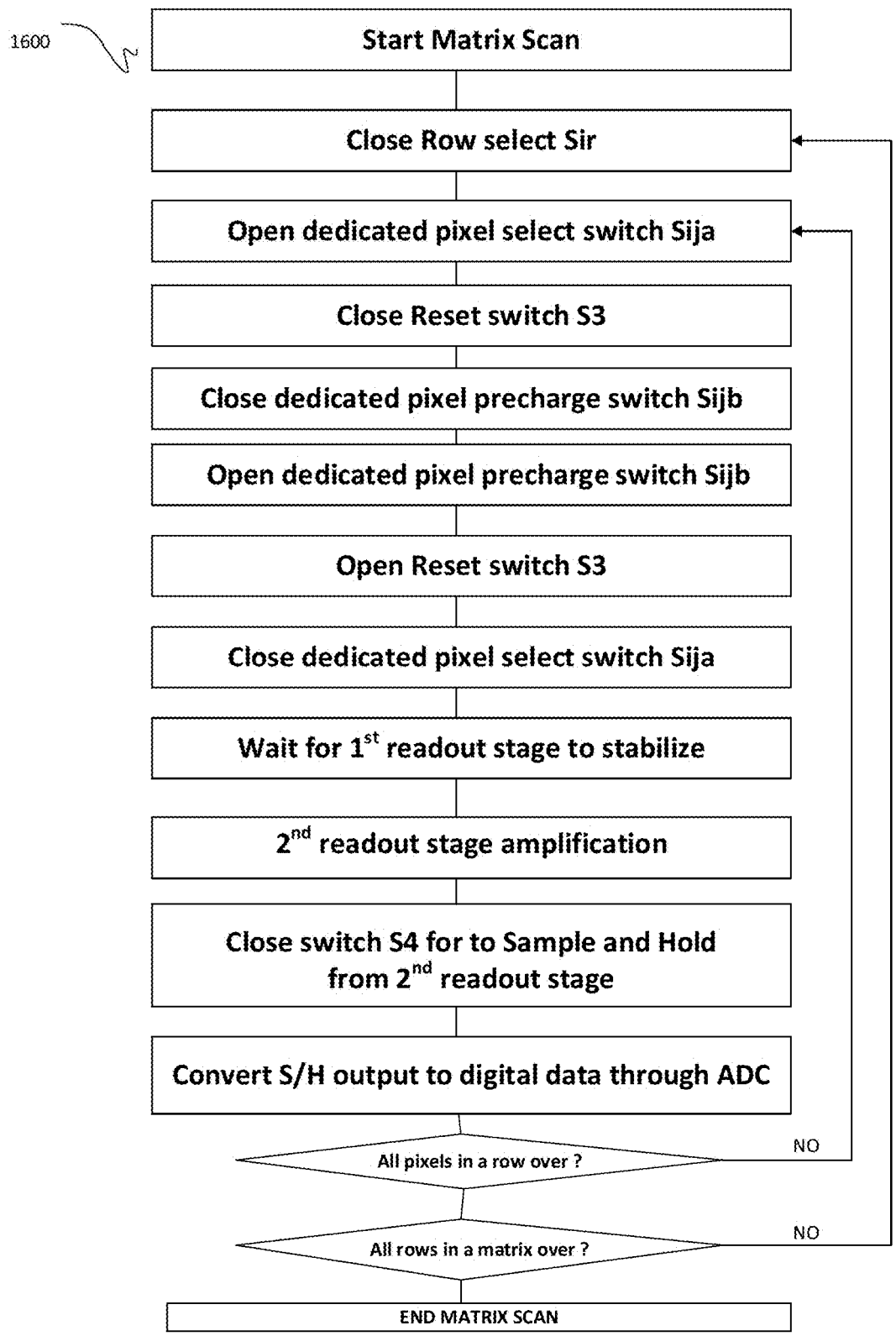
FIG. 16 shows an illustrative embodiment of processing steps.

FIG. 16 shows an illustrative embodiment of processing steps 1600. In particular, FIG. 16 shows processing steps for converting the capacitance between the sense plate and a finger surface into a computer readable format. The sense cell matrix scanning is started upon receiving a command from the host controller. First a row is selected by closing the corresponding row select switch Sir. This switch remains closed until all sensor cells within the row are scanned. For each sensor cell within the row, in a first step the switch $S_{ija}$ is opened, the reset switch S3 in the first readout stage 1502 of the common readout circuit is closed to reset the first readout stage 1502 and the preset switch $S_{ijb}$ is closed to connect the sense plate to the system ground potential. Then, in a second step reset switch S3 is opened, switch $S_{ijb}$ is opened and switch $S_{ija}$ is closed to connect the sense plate to the common row read rail. The first readout stage output starts to build a voltage corresponding to the sense capacitance. Once the first stage output stabilizes, a programmable gain adjustment is performed using the second readout stage 1504. After the second readout stage output is stabilized, it is stored in a sample-and-hold circuit 1506 by closing switch 54. The sample-and-hold output is converted to a digital code using an analog-to-digital converter. After sensing all sensor cells in the matrix, the matrix scanning is stopped.

Figure 17:
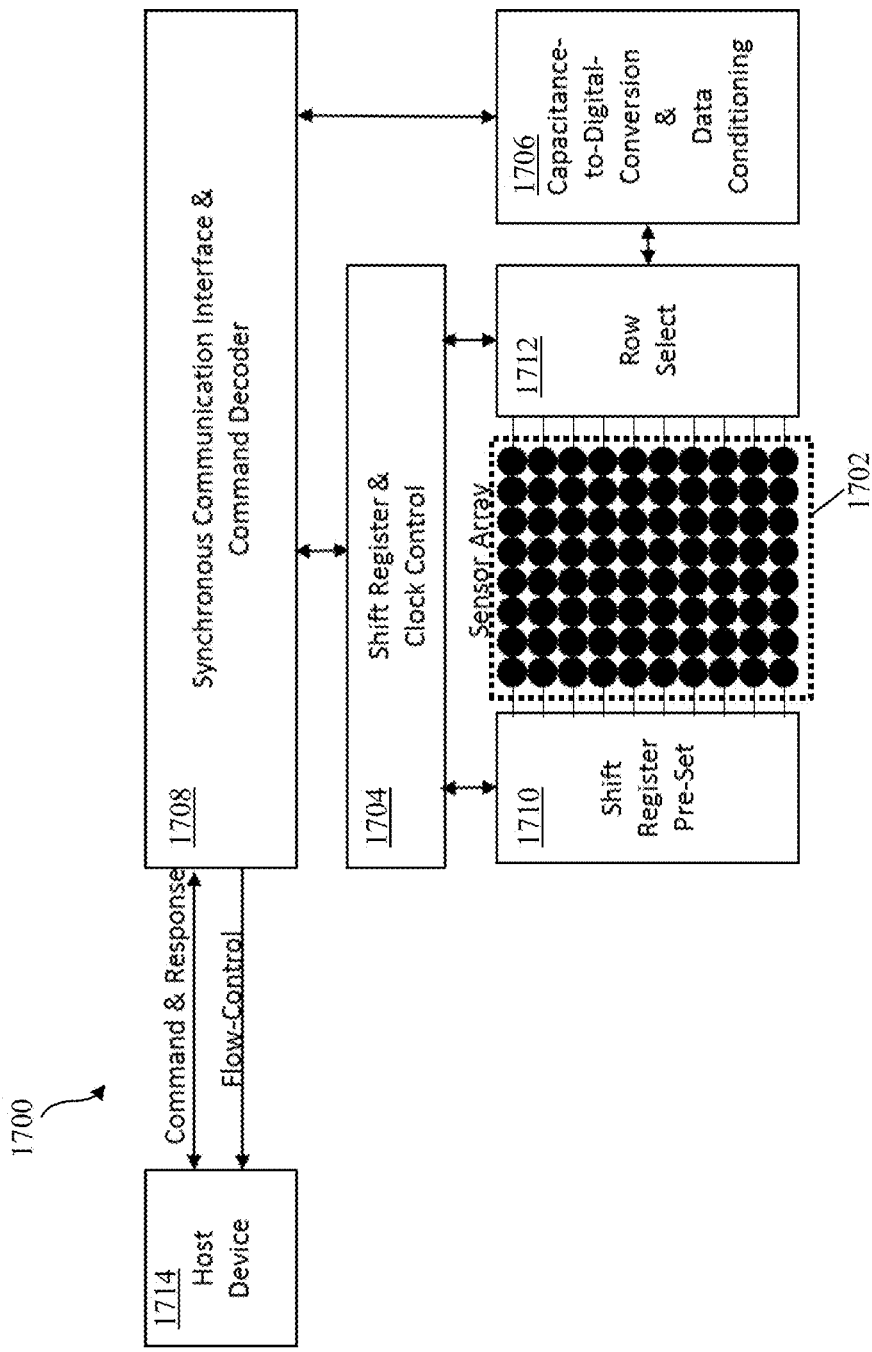
FIG. 17 shows an illustrative embodiment of a fingerprint sensing system.

FIG. 17 shows an illustrative embodiment of a fingerprint sensing system 1700. In particular, it shows how a matrix of sensor cells of the kind set forth can be integrated into a fingerprint sensing system 1700. A fingerprint sensing device may comprise, in addition to said matrix (i.e., sensor array 1702), a synchronous communication interface and command decoder block 1708, a shift register and clock control block 1704, a shift register preset block 1710, a row select block 1712, and capacitance-to-digital conversion and data conditioning block 1706. The communication interface 1708 may be configured to receive commands from a host device 1714. An embedded command decoder may be configured to control the shift register and clock control unit 1704 in response to the commands and associated data received from the host device 1714. Read access to individual sensor cells is controlled by the outputs of shift-registers, wherein one shift-register may control access to sensor cells being arranged in one row. Multiple of said shift-registers may enable accessing sensor cells in multiple rows. The shift register and clock control unit 1704 may be a state machine that in conjunction with said shift-registers may be configured to sequentially select and read individual sensor cells of the sensor array 1702. A row-select unit 1712 may, under control of the shift-register and clock control unit 1704, connect an individual sensor cell to a central readout unit included in the row-select unit 1712, which may perform a capacitance-to-voltage conversion. The capacitance-to-digital conversion and data conditioning block 1706 may be configured to convert a voltage level provided by said readout unit into its numerical representation. Said numerical representation may be communicated by the communication interface unit 1708 to the host device 1714.

Figure 18:
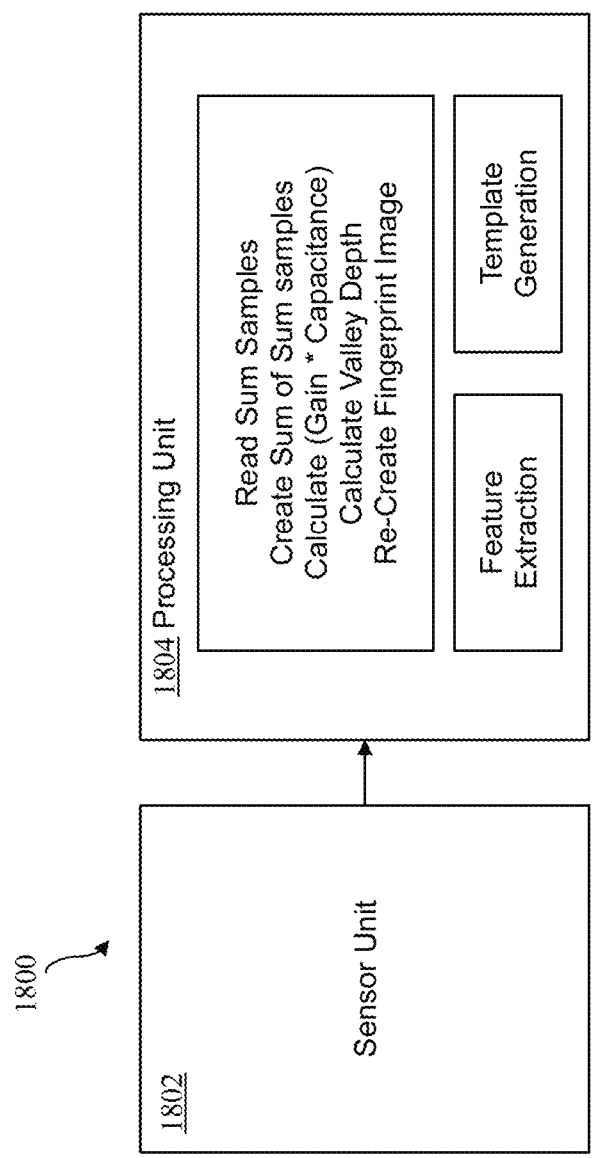
FIG. 18 shows another illustrative embodiment of a fingerprint sensing system.

FIG. 18 shows another illustrative embodiment of a fingerprint sensing system 1800. In particular, FIG. 18 shows how a sensor unit 1802 cooperates with a processing unit 1804 that executes a fingerprint feature extraction function and a fingerprint template generation function. The sensor unit 1802 may comprise the sensor array 1702, synchronous communication interface and command decoder block 1708, shift register and clock control block 1704, shift register preset block 1710, row select block 1712, and capacitance-to-digital conversion and data conditioning block 1706 shown in FIG. 17. The processing unit 1804 may be included in the host device 1714 shown in FIG. 17. In operation, the processing unit 1804 may recreate a fingerprint image by performing calculations on measurement results received from the sensor unit 1802, extract relevant features (e.g., minutiae such as ridge endings and ridge bifurcations), and generate a fingerprint template based on the extracted features, which can be compared with a reference template, for example.

Figure 19:
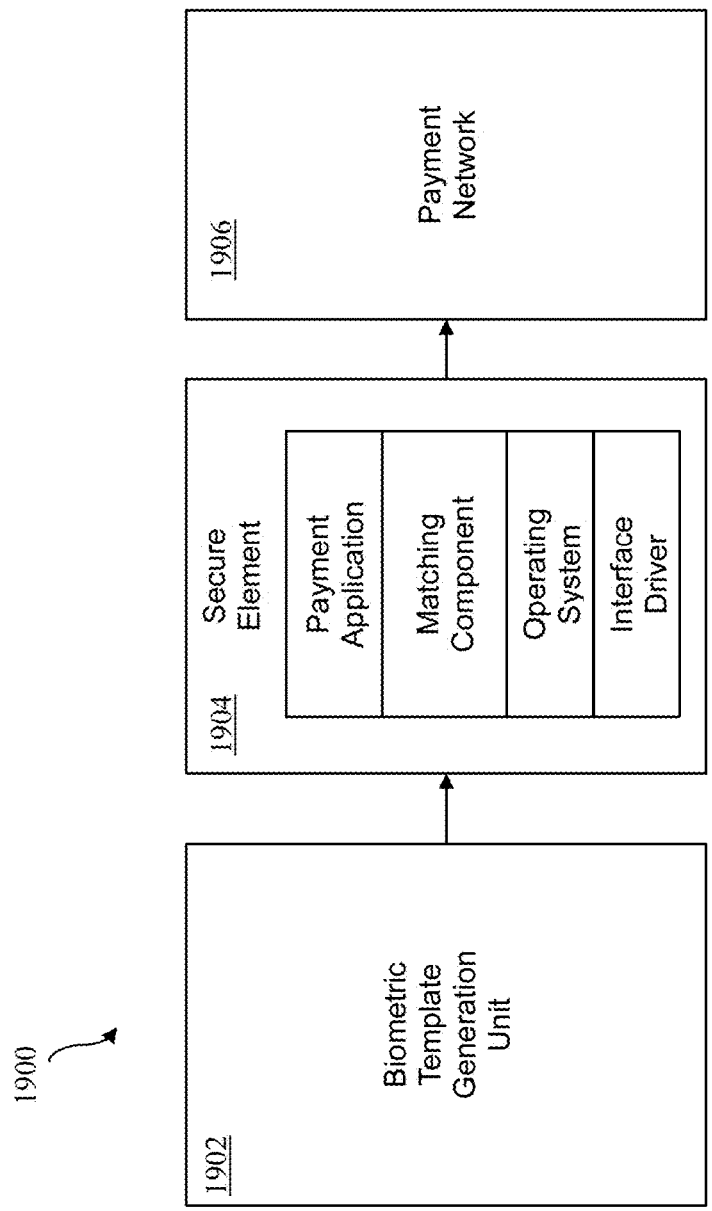
FIG. 19 shows an illustrative embodiment of a payment system.
Figure 20:
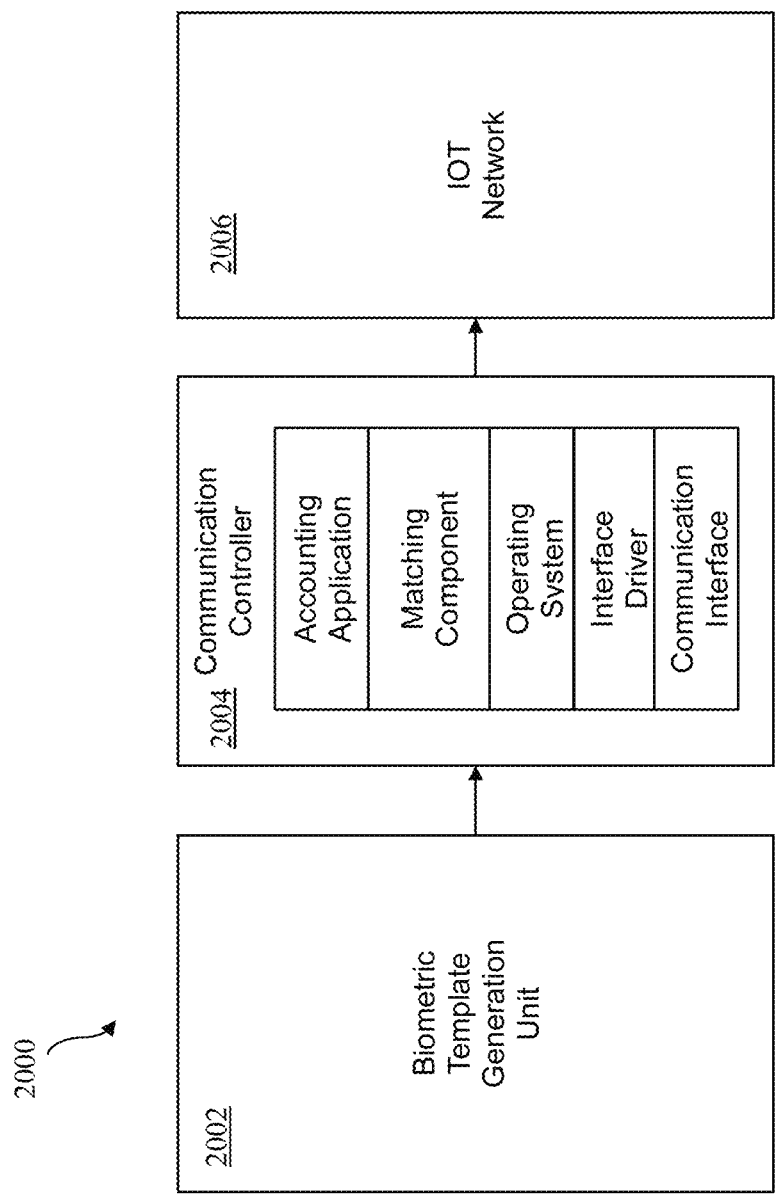
FIG. 20 shows an illustrative embodiment of an IOT system.

FIGS. 19 and 20 illustrate how a generated fingerprint template (i.e., biometric template) can be used to advantage in different applications.

FIG. 19 shows an illustrative embodiment of a payment system 1900. The payment system 1900 comprises a biometric template generation unit 1902, for example the template generation unit comprised in the processing unit 1804 shown in FIG. 18. Furthermore, the payment system 1900 comprises a secure element 1904 and a payment network 1906. The biometric template generation unit 1902 and the secure element 1904 may be embedded, for example, in a mobile phone. The secure element 1904 comprises a matching component that is configured to compare a biometric template received from the biometric template generation unit 1902 with a stored reference template. If the received template matches the reference template, then a payment application comprised in the secure element 1904 may initiate a payment through the payment network 1906.

FIG. 20 shows an illustrative embodiment of an Internet-of-Things (IOT) system 2000. The IOT system 2000 comprises a biometric template generation unit 2002, for example the template generation unit comprised in the processing unit 1804 shown in FIG. 18. Furthermore, the IOT system 2000 comprises a communication controller 2004 and an IOT network 2006. The biometric template generation unit 2002 and the communication controller 2004 may be embedded in an TOT device. The communication controller 2004 comprises a matching component that is configured to compare a biometric template received from the biometric template generation unit 2002 with a stored reference template. If the received template matches the reference template, then an accounting application comprised in communication controller 2004 may initiate an accounting operation through the IOT network 2006.

Figure 21:
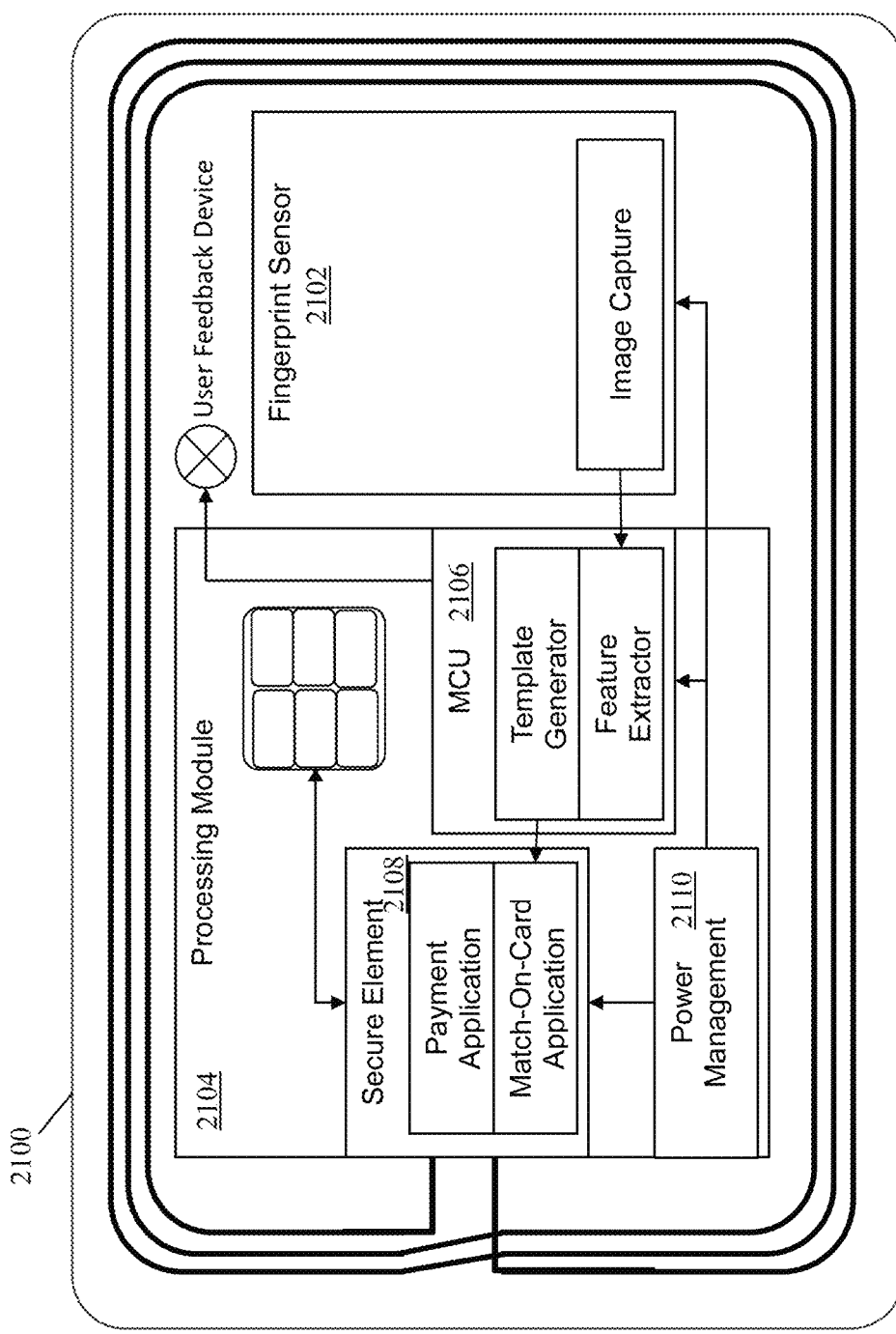
FIG. 21 shows an illustrative embodiment of a smart card.

FIG. 21 shows an illustrative embodiment of a smart card 2100. The smart card 2100 comprises a fingerprint sensor 2102, which may be a fingerprint sensing device of the kind set forth herein. The fingerprint sensor 2102 is embedded into a smart card 2100 together with a processing module 2104 that may perform different functions. The processing module 2104 comprises a processing unit (i.e., microcontroller) 2106, a secure element 2108, and a power management unit 2110. An image capture unit of the fingerprint sensor 2102 is configured to capture a fingerprint image. The secure element 2108 may execute a payment application requesting authentication from a fingerprint-match-on-card application, wherein said fingerprint-match-on card application communicates with the MCU 2106 to obtain a fingerprint feature list for matching against a fingerprint reference feature list that is securely stored in the secure element 2108. The MCU 2106 communicates with the fingerprint sensor 2102 in order to receive an electronic representation of a fingerprint pattern. The MCU 2106 is further configured to process said electronic representation of a fingerprint pattern in order to extract features from said representation and converting them into said feature list in a machine-readable format. The MCU 2106 may furthermore provide user feedback through a user feedback device, to guide the fingerprint imaging process. The secure element 2108 may communicate through an ISO-7816 and/or ISO-14443 interface with a payment network and/or an identification network (not shown).

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 fingerprint sensing device
102 sensor IC
104 discharge electrode
106 sense plate
108 sensor cell
110 sensor matrix
112 common circuit
200 fingerprint sensing device
202 device supply
204 ESD grid contact pad
206 ESD grid contact pad
300 fingerprint sensing device
302 discharge electrode
304 first voltage potential rail
306 readout rail
308 pixel addressing rail
310 second voltage potential rail
312 shield rail
314 clock rail
316 first discharge path
318 second discharge path
320 charge reservoir
322 sense and shield plate control unit
324 capacitive sensing plate
326 shield plate
400 cross-section of sensor cell
402 P-substrate
404 first capacitor plate
406 shield
408 sense plate
410 ESD grid
412 passivation
414 coating
416 N-well (second capacitor plate)
500 cross-section of sensor cell
600 cross-section of sensor cell
700 cross-section of sensor cell
800 implementations of discharge paths
802 first implementation
804 second implementation
806 third implementation
900 discharge path in operation
902 finger
1000 discharge path in operation
1100 supply rail clamp circuit
1102 supply rail clamp circuit
1200 IO cell
1300 coupling from fingertip to circuit ground
1400 coupling paths
1500 capacitance measurement principle
1502 first readout stage
1504 second readout stage
1506 sample-and-hold circuit
1600 processing steps
1700 fingerprint sensing system
1702 sensor array
1704 shift register and clock control
1706 capacitance-to-digital conversion and data conditioning
1708 synchronous communication interface and command decoder
1710 shift register preset
1712 row select
1714 host device
1800 fingerprint sensing system
1802 sensor unit
1804 processing unit
1900 payment system
1902 biometric template generation unit
1904 secure element
1906 payment network
2000 IOT system
2002 biometric template generation unit
2004 communication controller
2006 IOT network
2100 smart card
2102 fingerprint sensor
2104 processing module
2106 microcontroller
2108 secure element
2110 power management unit

The invention claimed is:

1. A fingerprint sensing device implemented in an integrated circuit (IC), the fingerprint sensing device comprising a plurality of sensor cells, wherein each sensor cell comprises:
at least one capacitive sense plate formed in a first metal layer of the IC and a discharge electrode formed in a second metal layer of the IC and insulated from the capacitive sense plate;
a first discharge path for discharging a first static electricity charge from the capacitive sense plate to a first electric potential terminal;
a second discharge path for discharging a second static electricity charge from the capacitive sense plate to a second electric potential terminal;
a charge reservoir having a first terminal coupled to the first electric potential terminal and a second terminal coupled to the second electric potential terminal, the charge reservoir configured to take up electrostatic charge originating from the capacitive sense plate, wherein the charge reservoir comprises a capacitor formed using first and second plate electrodes that are planar and positioned parallel and spaced apart from each other, the first plate electrode formed using a conductive layer formed between the capacitive sense plate and a substrate of the IC, and a second plate electrode formed by an n-well layer in the substrate;
a shield plate positioned between the sense plate and a substrate of the device, wherein the shield plate and the sense plate are separated from each other by an insulator;
a first switch for connecting the capacitive sense plate to a common row read rail;
a second switch for connecting the capacitive sense plate to a system ground;
a third switch for connecting the shield plate to the system ground; and a fourth switch for connecting shied plate to a common shield drive rail, wherein the first, second, third, and fourth switches are controlled by a sense and shield plate control circuit.

2. The device of claim 1, wherein the first discharge path, the second discharge path and the charge reservoir are implemented in a voltage clamping circuit.

3. The device of claim 1, wherein the charge reservoir is implemented as a capacitor.

4. The device of claim 3, wherein the capacitor is formed by a first capacitor plate in a polysilicon layer and a second capacitor plate in an n-well layer of said device.

5. The device of claim 1, wherein the plurality of sensor cells is organized as a matrix.

6. The device of claim 1, further comprising a first operational transconductance amplifier having a first input terminal coupled to the common read rail, a second input terminal coupled to the system ground and an output terminal; a second operational transconductance amplifier having a first input coupled to the system ground, and a second input coupled to a reference voltage, and an output coupled to the common shield drive rail; and a third operational transconductance amplifier having a first input coupled to the output of the first operational transconductance amplifier, a second input coupled to a programmable common mode generator, and an output.

7. The device of claim 1, wherein the discharge electrode forms part of a grid of discharge electrodes.

8. The device of claim 7, wherein said grid is connected to an external ground potential via one or more bonding wires and/or bumps.

9. The device of claim 8, wherein multiple bonding wires are connected in parallel.

10. The device of claim 1, further comprising a metal layer between the sense plate and the discharge electrode.

11. The device of claim 1, wherein the sense plate and the discharge electrode are implemented in adjacent metal layers and insulated from each other by a dielectric layer.

12. The device of claim 1, further comprising a protective layer that covers the plurality of sensor cells, wherein said protective layer has a thickness of at least 20 µm.

13. The device of claim 1, further comprising a first readout stage and a second readout stage, wherein the second readout stage is configured to receive a programmable common mode voltage input.

14. A smart card, a wearable device, an Internet of Things device, or a smart grid device comprising the fingerprint sensing device of claim 1.

15. A method of producing a fingerprint sensing device in an integrated circuit (IC) comprising said fingerprint sensing device having a plurality of sensor cells, the method comprising:
  forming at least one capacitive sense plate in a first metal layer of the IC and a discharge electrode in a second metal layer of the IC and insulated from the capacitive sense plate;
  forming a first discharge path for discharging a first static electricity charge from the capacitive sense plate to a first electric potential terminal;
  forming a second discharge path for discharging a second static electricity charge from the capacitive sense plate to a second electric potential terminal;
  forming a charge reservoir having a first terminal coupled to the first electric potential terminal and a second terminal coupled to the second electric potential terminal, the charge reservoir configured to take up electrostatic charge originating from the capacitive sense plate, wherein the charge reservoir comprises a capacitor formed using first and second plate electrodes that are planar and positioned parallel and spaced apart from each other, the first plate electrode formed using a conductive layer formed between the capacitive sense plate and a substrate of the IC, and a second plate electrode formed by an n-well layer in the substrate;
  forming a shield plate positioned between the sense plate and a substrate of the device;
  providing a first switch for connecting the capacitive sense plate to a common row read rail;
  providing a second switch for connecting the capacitive sense plate to a system ground;
  providing a third switch for connecting the shield plate to the system ground; and
  providing a fourth switch for connecting shied plate to a common shield drive rail, wherein the first, second, third, and fourth switches are controlled by a sense and shield plate control circuit.

* * * * *